United States Patent [19]

Kunito et al.

[11] Patent Number: 5,465,179
[45] Date of Patent: Nov. 7, 1995

[54] MULTICHANNEL RECORDING AND/OR REPRODUCING APPARATUS

[75] Inventors: Yoshiyuki Kunito; Tadashi Fukami, both of Kanagawa, Japan

[73] Assignee: Sony Corporation, Tokyo, Japan

[21] Appl. No.: 273,966

[22] Filed: Jul. 12, 1994

Related U.S. Application Data

[62] Division of Ser. No. 132,995, Oct. 7, 1993.

[30] Foreign Application Priority Data

Oct. 8, 1992 [JP] Japan .................. 4-296437
Oct. 13, 1992 [JP] Japan .................. 4-301853
Oct. 13, 1992 [JP] Japan .................. 4-301854

[51] Int. Cl.$^6$ ............... G11B 5/00; G11B 15/14
[52] U.S. Cl. .................. 360/8; 360/13; 360/32; 360/33.1; 360/64
[58] Field of Search .............. 360/8, 53, 61, 360/62, 64, 31, 13, 29, 22, 10.1, 32, 33.1; 358/335; 369/60

[56] References Cited

U.S. PATENT DOCUMENTS

| | | | |
|---|---|---|---|
| 4,905,104 | 2/1990 | Okamoto et al. | 360/8 X |
| 5,063,453 | 11/1991 | Yoshimura et al. | 360/8 X |
| 5,197,101 | 3/1993 | Mok | 360/8 X |
| 5,285,326 | 2/1994 | Fukami | 360/32 |
| 5,337,199 | 8/1994 | Arai et al. | 360/8 |

*Primary Examiner*—Andrew L. Sniezek
*Attorney, Agent, or Firm*—Jay H. Maioli

[57] ABSTRACT

In a magnetic recording and/or reproducing apparatus, when the reproduced audio data is processed in the reproduction system and the record system and is re-recorded in every cycle of N times the cycle during which the reproducing magnetic head scans a pair of recording tracks, the recording magnetic head is positioned behind the reproducing magnetic head for 8.5+4N track pitch so that the reproduced audio data can be re-recorded on the original recording track, therefor a write-after-read processing can be realized. In the recording magnetic head positioned behind the reproducing magnetic head for the specific track pitch, the audio data is stored in a memory circuit for time base compression and expansion with a multichannel mode such as to record the reproduced audio data at the same part on the magnetic tape, so that a magnetic recording and/or reproducing apparatus which enables to perform the write-after-read processing can be obtained with simple construction if the number of channel is switched. The 2 channel audio data is recorded by interleave processing in every cycle of N times the cycle forming a pair of recording tracks, so that even when the cycle during which a pair of recording track is formed is not kept to a multiple of integer of sample cycle, a magnetic recording apparatus and a magnetic recording and/or reproducing apparatus which record and reproduce a plurality of channel audio data can be provided.

12 Claims, 16 Drawing Sheets

| SAMPLING FREQUENCY \ ROTATION NUMBER | 1000 [rpm] | 2000 [rpm] |
|---|---|---|
| 32 [KHz] | 2-CHANNEL | 4-CHANNEL |
| 44.1 [KHz] | | 2-CHANNEL |
| 48 [KHz] | | 2-CHANNEL |

FIG. 1 (PRIOR ART)

| SAMPLING FREQUENCY \ ROTATION NUMBER | 1000 [rpm] | 2000 [rpm] | 4000 [rpm] |
|---|---|---|---|
| 32 [KHz] | 2-CHANNEL | 4-CHANNEL | 8-CHANNEL |
| 44.1 [KHz] | | 2-CHANNEL | 4-CHANNEL |
| 48 [KHz] | | 2-CHANNEL | 4-CHANNEL |

FIG. 11

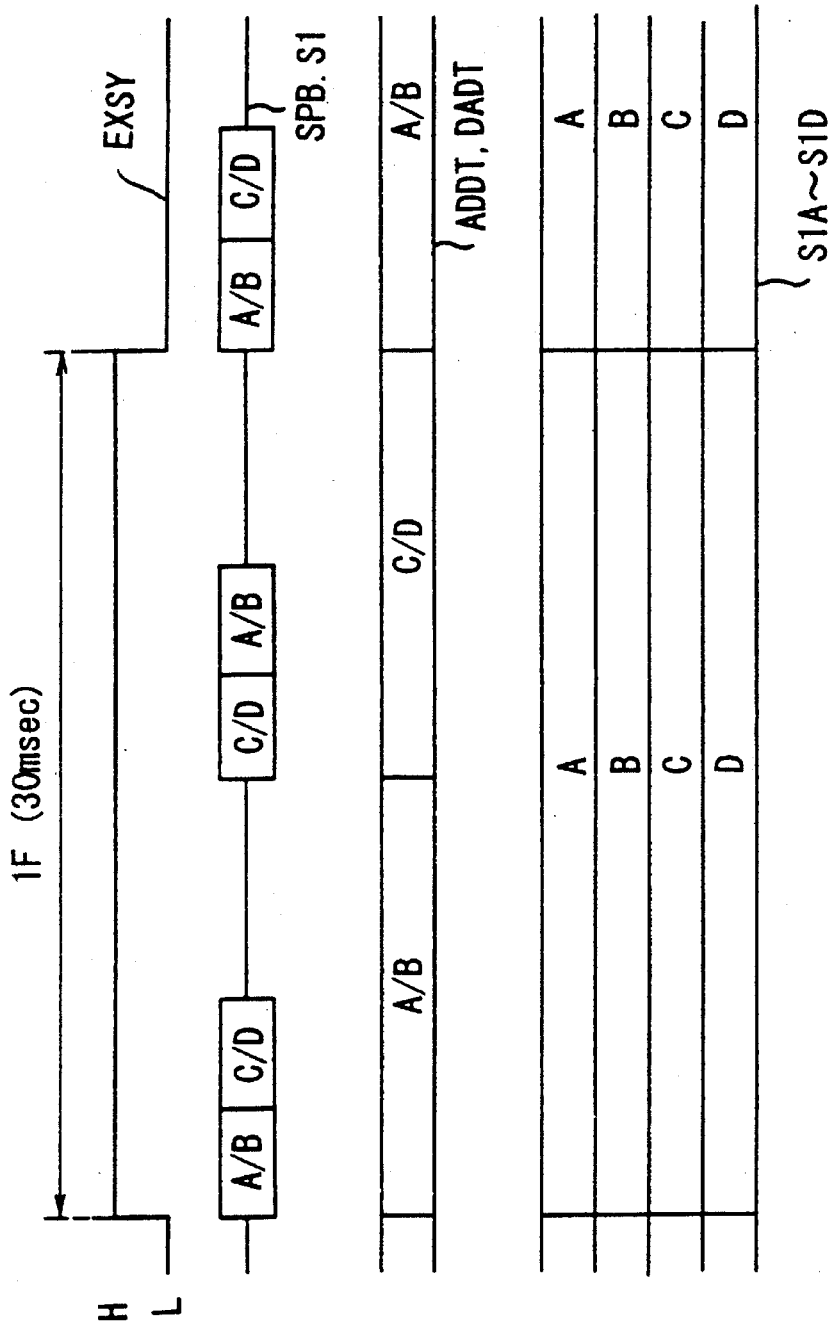

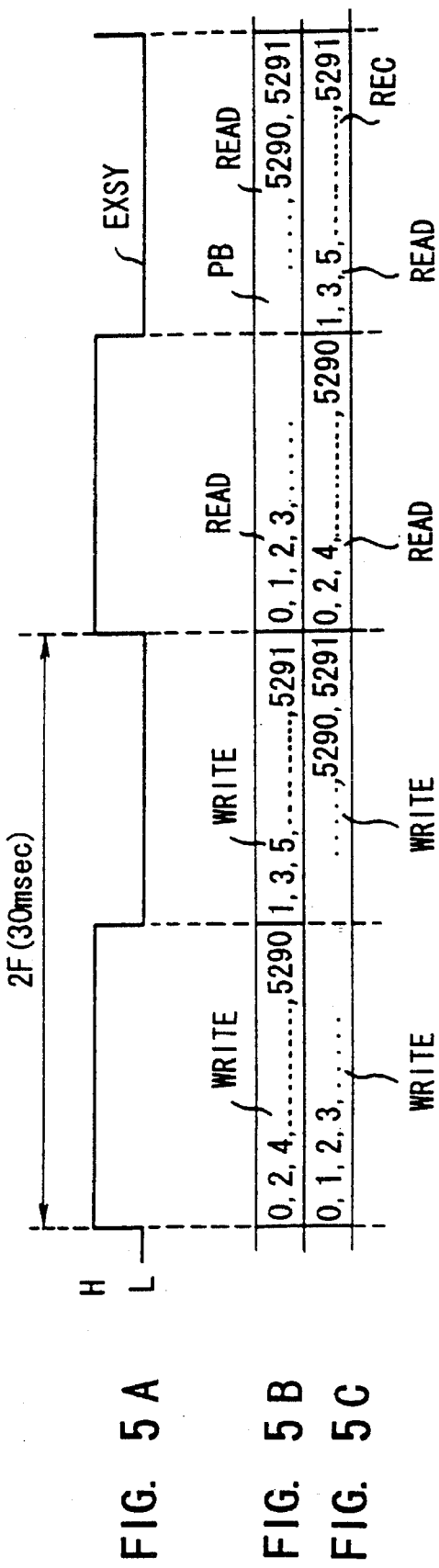

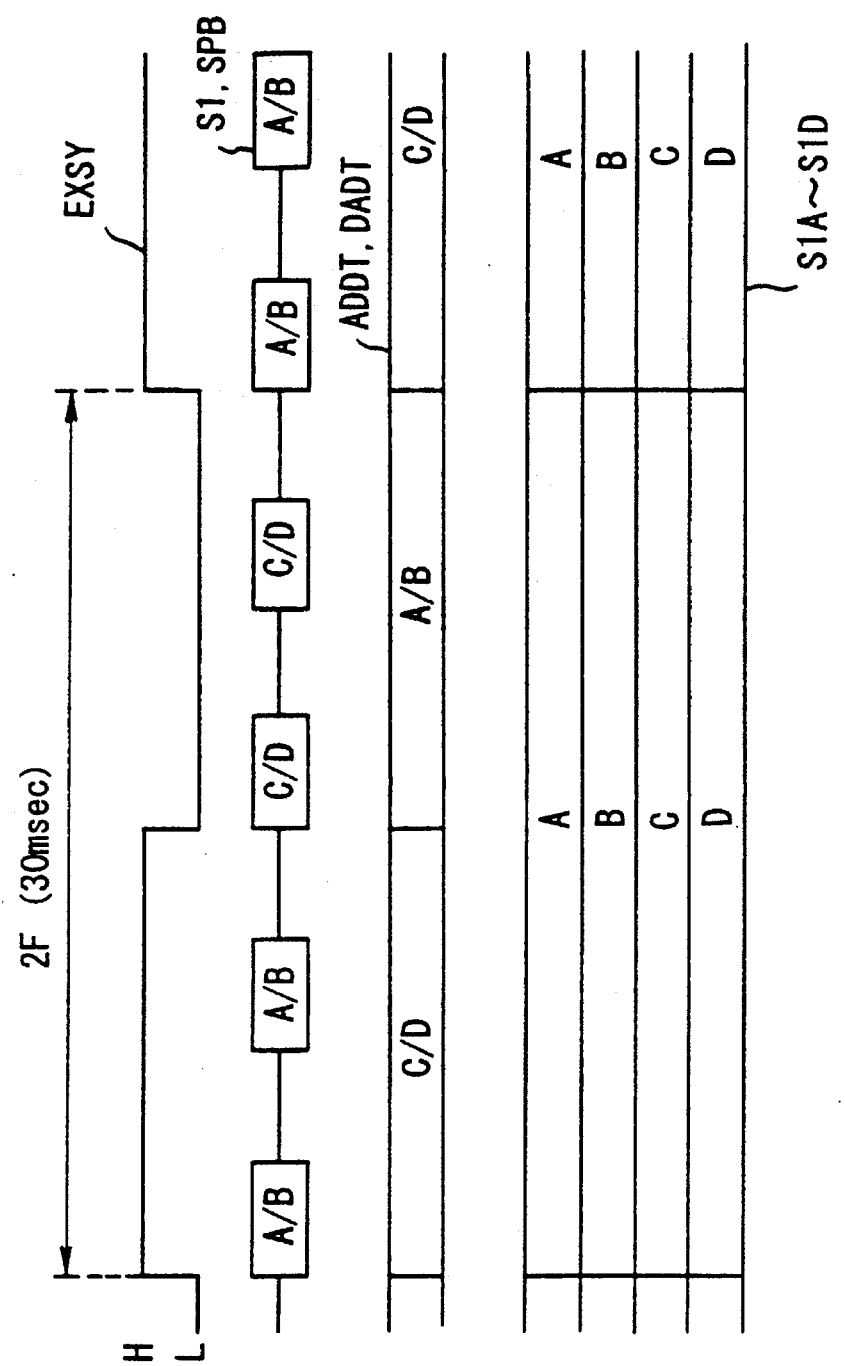

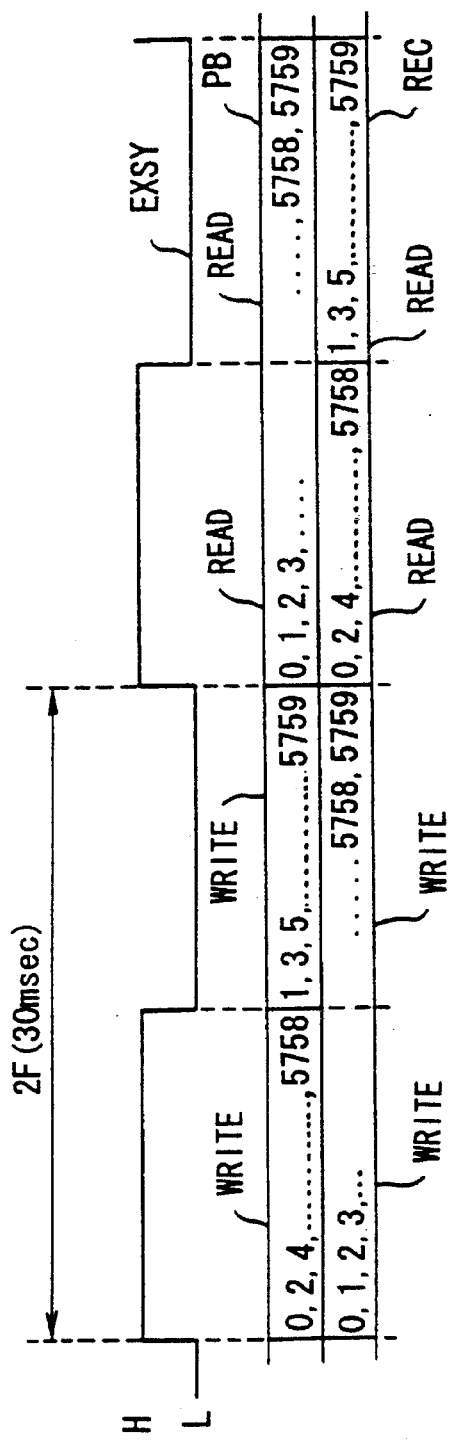

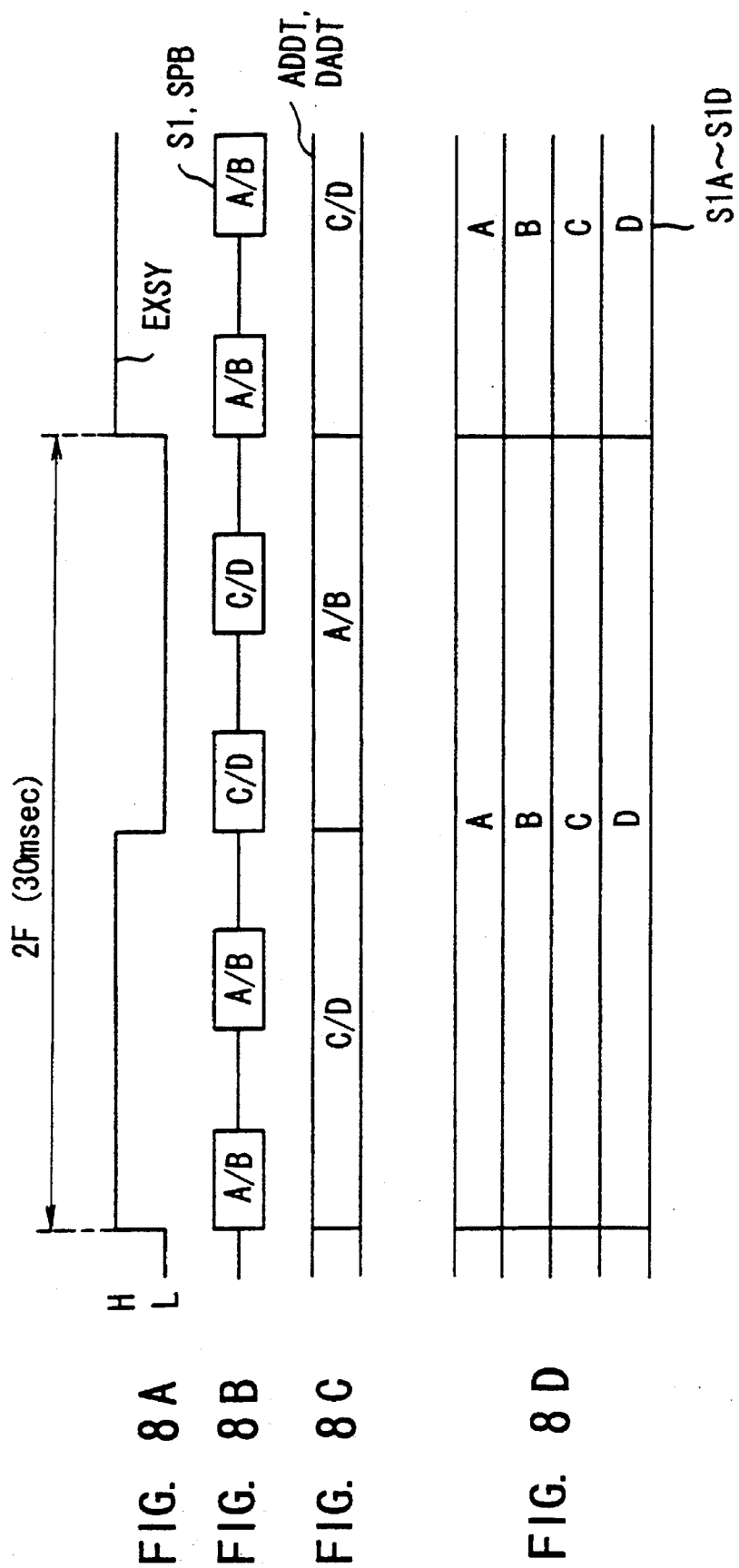

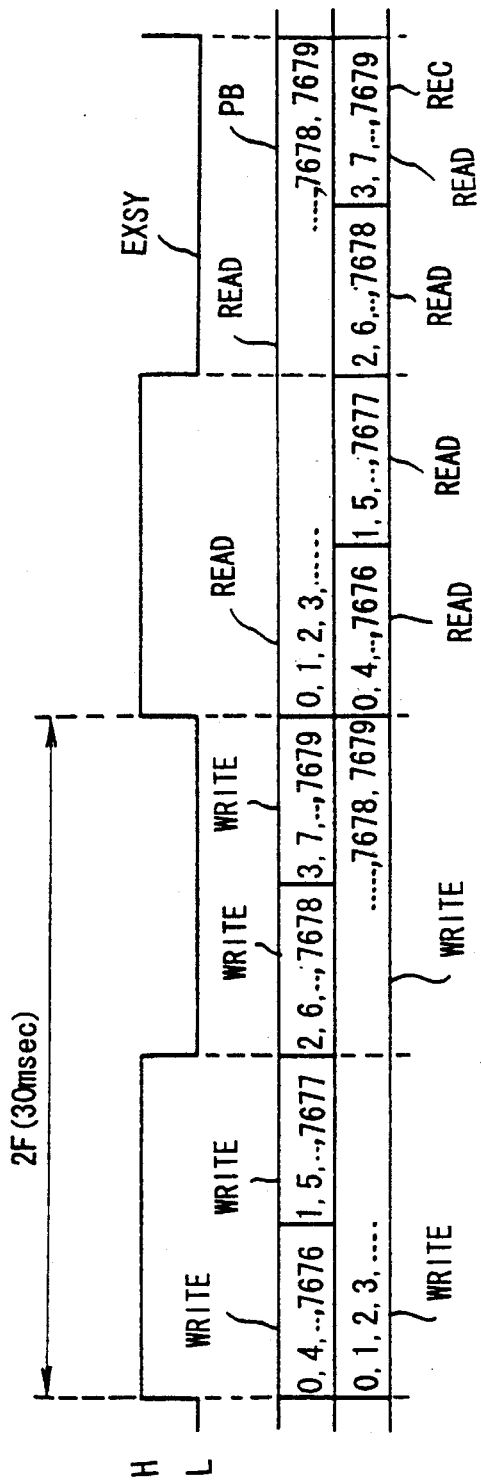

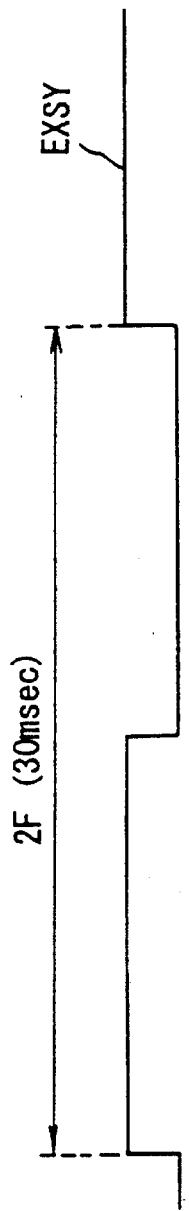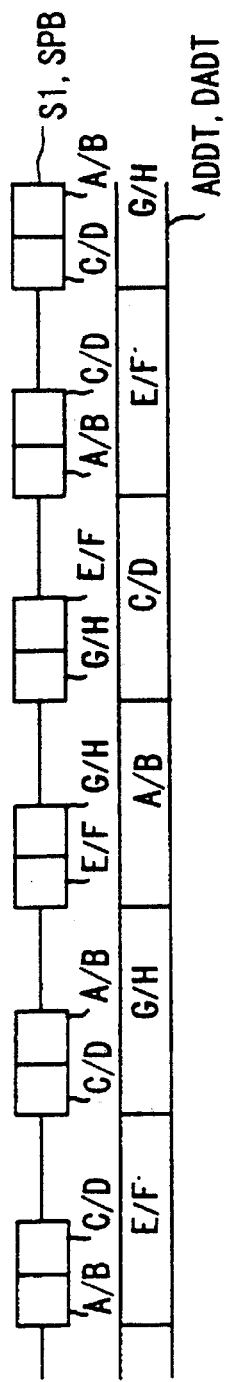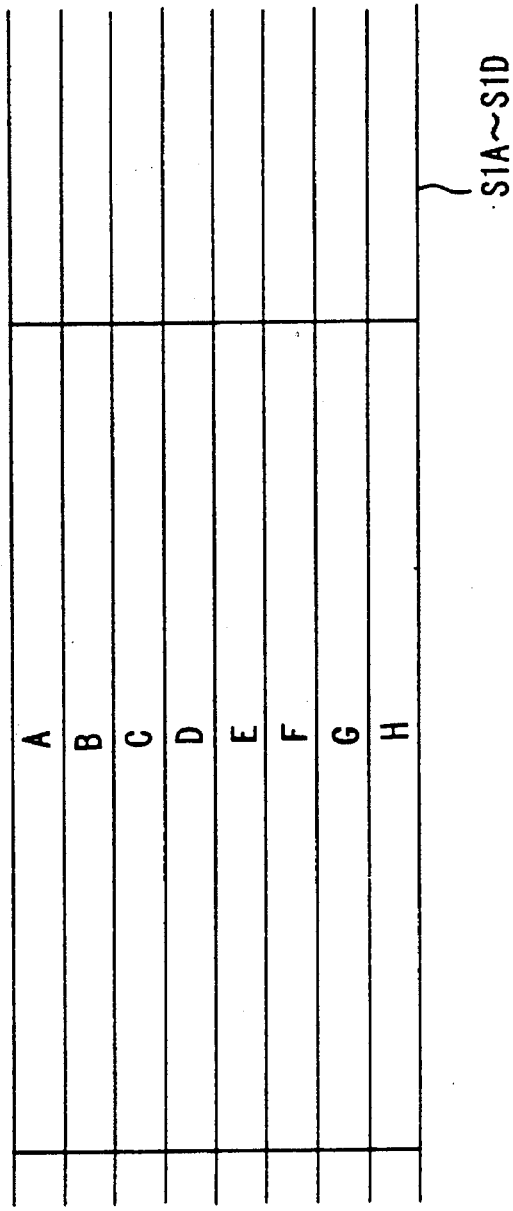

|  | LSB | ADDRESS VALUE |
|---|---|---|
| FIRST HALF FRAME | · · · · · 0 0 0 0 0<br>· · · · · 0 0 0 0 1<br>· · · · · 0 0 1 0 0<br>· · · · · 0 0 1 0 1<br>· | 0<br>1<br>4<br>5<br>· |
| SECOND HALF FRAME | · · · · · 0 0 0 1 0<br>· · · · · 0 0 0 1 1<br>· · · · · 0 0 1 1 0<br>· · · · · 0 0 1 1 1<br>· | 2<br>3<br>6<br>7<br>· |

FIG. 17

|  | LSB | ADDRESS VALUE |
|---|---|---|
|  | · · · · · 0 0 0 0 0<br>· · · · · 0 0 1 0 0<br>· · · · · 0 1 0 0 0<br>· | 0<br>4<br>8<br>· |
|  | · · · · · 0 0 0 0 1<br>· · · · · 0 0 1 0 1<br>· · · · · 0 1 0 0 1<br>· | 1<br>5<br>9<br>· |
|  | · · · · · 0 0 0 1 0<br>· · · · · 0 0 1 1 0<br>· · · · · 0 1 0 1 0<br>· | 2<br>6<br>10<br>· |

FIG. 18

MULTICHANNEL RECORDING AND/OR REPRODUCING APPARATUS

This is a division of application Ser. No. 08/132,995, filed Oct. 7, 1993 pending.

BACKGROUND OF THE INVENTION

1. Field of the Invention

This invention relates to a magnetic recording and/or reproducing apparatus, and more particularly can be applied to, for example, editing of multichannel audio signals by utilizing a digital audio tape recorder.

2. Description of the Related Art

Conventionally, there has been known a digital audio tape recorder which is designed to record or reproduce high quality audio signals by recording or reproducing digital audio signals with a rotary drum.

In the digital audio tape recorder, as shown in FIG. 1, three types of formats recorded and reproduced with a sampling frequency of 32 [kHz], 44.1 [kHz], or 48 [kHz] are provided. In a format of 32 [kHz] sampling frequency, 2- or 4-channel audio signals can be recorded and reproduced by changing the rotating speed of a rotary drum.

It is expected that the utility of such digital audio tape recorder can be improved if such recorder can record or reproduce an audio signal in or from multichannels.

In addition, in such case, if digital audio signal can be recorded or reproduced, an editing or mixing process can be performed by using one reel of magnetic tape, as required, so that the utility can be further improved.

A system has been proposed in which reproducing and recording magnetic heads are arranged on a rotary drum so that digital audio signals reproduced by the reproducing magnetic head is subject to an editing or mixing process, and then the processed signals are rerecorded by the succeeding recording magnetic head. Thus processing is referred to as a processing of write-after-read.

In this case, audio data for multichannels can be recorded or reproduced by time base compressing and multiplexing the multichannel audio data, whereby the write-after-read processing can be attained for multichannel audio data.

It is believed to be convenient if the multichannel digital audio tape recorder can also edit 2-channel audio signals as described in the above.

An apparatus, which can record and reproduce audio signal in or from multichannels and can perform write-after-read, is disclosed in U.S. patent application Ser. No. 912,226 filed Jul. 10, 1992.

However, there is a problem that the write-after-read processing can not be performed because the processing of time base compression and expansion takes time so that reproducing and recording audio data takes time, if the magnetic head for recording and reproducing is arranged as the case where audio data of two channels are respectively edited.

Furthermore, the reproduced audio data cannot be recorded on the original recording tracks. Consequently, the multichannel digital audio tape recorder suffers from a problem that write-after-read processing cannot be performed in a case where the number of channels is changable.

Also, in the format of the sampling frequency 44.1 [kHz] and 48 [kHz] similar to the case of the format of sampling frequency 32 [kHz], if 4-channel digital audio signal can be recorded or reproduced, audio signal having higher quality can be recorded or reproduced with 4-channel in comparison with the case of the format of sampling frequency 32 [kHz], so that the utility can be further improved.

In this case, it is considered to use the same method with the case of the format of sampling frequency 32 [kHz] so as to record or produce 4-channel audio signal.

That is, it is considered that, in the 4-channel format of sampling frequency 32 [kHz], the speed for forming recording track and the processing speed of the signal processing system are doubled, and 4-channel audio signal is multiplexed, as a result 4-channel audio signal is recorded and reproduced.

In this method, the format of sampling frequency 48 [kHz] can record or reproduce 4-channel audio signal. However, there is a problem that the format of sampling frequency 44.1 [kHz] can not record or reproduce 4-channel audio signal.

That is, this type of the digital audio tape recorder performs interleave processing for input data in every cycle (hereinafter, referred to as "1 frame cycle") which forms a pair of recording tracks consisting of the plus and minus azimuth angles.

Because of this, regarding the digital audio signal, when the speed for processing magnetic tape driving system is doubled and the 4-channel digital audio signal is recorded and reproduced, it is required that the cycle forming a pair of recording tracks is kept to an integer multiple.

In this case, the speed for processing magnetic tape driving system is doubled so that the cycle forming recording tracks can be shown to be 15 [msec], and the format of sampling frequency 48 [kHz] can be represented by the following formula:

$$15[\text{msec}] \times 48[\text{kHz}] = 720[\text{sample/frame}] \qquad (1)$$

Therefore, it can be recognized that the cycle forming a pair of recording tracks is kept to an multiple of integer multiple of sampling cycle of the audio data.

The format of sampling frequency 44.1 [kHz] can be shown by the formula:

$$15[\text{msec}] \times 44.1[\text{kHz}] = 661.5[\text{sample/frame}] \qquad (2)$$

when its speed is doubled similar to the case of sampling frequency 48 [kHz].

Therefore, it can be recognized that the cycle forming a pair of recording tracks is not kept to an integer multiple of sampling cycle of the audio data.

There is a case where the cycle forming a pair of recording tracks is not an integer multiple of the sampling cycle of audio data depending on the sampling frequency described above, and a problem occurs in which data is not completed.

SUMMARY OF THE INVENTION

Objects of the present invention are:

(1) shortening the time for recording and reproducing in a magnetic recording and/or reproducing apparatus which is able to perform write-after-read;

(2) ability to perform write-after-read even when the number of channel is changeable in the multichannel magnetic recording and/or reproducing apparatus;

(3) ability to record or reproduce the multichannel audio signal even when the cycle forming a pair of recording tracks is not multiple of the sampling cycle of audio data.

The foregoing object and other objects of the invention have been achieved as shown in FIG. 2 by the provision of a magnetic recording and/or reproducing apparatus 1 for recording audio data D1A to D1H by helically sequentially forming a pair of recording tracks with plus and minus azimuth angles on a magnetic tape. The magnetic recording and/or reproducing apparatus 1 comprising: a reproducing means 30 for obtaining reproduced data DADT by processing reproduced signals SPB output from a reproducing magnetic heads 6A and 6B mounted on a rotary drum 2, performing error correction processing for the reproduced data DADT in every cycle during which the reproducing heads 6A and 6B scan a pair of recording tracks, and performing de-interleave processing in every cycle during which the reproducing heads 6A and 6B scan a pair of recording tracks, so as to output reproduced 2-channel audio data DADT; an audio data output circuit 18, 22 and 32 for sequentially storing and outputting reproduced 2-channel audio data DADT in every N times cycle during which the reproducing heads 6A and 6B scan a pair of recording tracks, so as to output the audio data D2A to D2H having the specific number of channels; an audio data input circuit 16, 18 and 26 for sequentially storing and outputting the output audio data D2A to D2H having the specific number of channels in every N times cycle during which the recording magnetic heads 4A and 4B positioned on rotary drum 2 behind the reproducing magnetic heads 6A and 6B form a pair of recording tracks, so as to output 2-channel recording audio data ADDT; and a recording signal generator circuit 24 for interleaving the 2-channel recording audio data ADDT in every cycle during which the recording magnetic heads 4A and 4B form a pair of recording tracks, for generating error correction codes in every cycle during which the recording magnetic heads 4A and 4B form a pair of recording tracks, and for recording on the magnetic tape the 2-channel recording audio data ADDT and the error correction codes through the recording magnetic heads 4A and 4B. The recording magnetic heads 4A and 4B are positioned behind the reproducing magnetic heads 6A and 6B, respectively, for at least 8.5+4N track pitch.

This invention solves a second problem by provision of a magnetic recording and/or reproducing apparatus 1 for recording audio data D1A to D1H by helically sequentially forming a pair of recording tracks with plus and minus azimuth angles on a tape comprising: a reproducing means 30 for obtaining reproduced data DADT by processing reproduced signals SPB output from reproducing magnetic heads 6A and 6B mounted on a rotary drum 2, performing error correction processing for the reproduced data DADT in every cycle during which the reproducing heads 6A and 6B scan a pair of recording tracks, and performing de-interleave processing in every cycle during which the reproducing heads 6A and 6B scan a pair of recording tracks, so as to output reproduced audio data DADT; an audio data output circuit 18, 22 and 32 for sequentially storing and outputting reproduced 2- channel audio data DADT, output from an audio data input circuit 16, 18 and 26, so as to output 2-channel recording audio data ADDT; and a recording signal generator circuit 24 for interleaving the 2-channel recording data ADDT in every cycle during which the recording magnetic heads 4A and 4B form a pair of recording tracks by driving the recording magnetic heads 4A and 4B positioned on the rotary drum 2 behind the reproducing magnetic heads 6A and 6B, respectively, generating error correction codes in every cycle during which the recording magnetic heads 4A and 4B form a pair of recording tracks, and recording on the magnetic tape the 2-channel recording data ADDT and the error correction codes through the recording magnetic heads 4A and 4B. In the multichannel mode, the audio data output circuit 18, 22 and 32 time base expanding the reproduced audio data DADT, so as to demodulate audio data D2A to D2H in M channels, where M is four or more, in every cycle during which the reproducing magnetic heads 6A and 6B scan a pair of tracks by sequentially storing and outputting the reproduced audio signal DADT, the audio data input circuit 16, 18 and 26 time base compress and, multiplex the M-channel audio data D2A to D2H in every cycle during which the recording magnetic heads 4A and 4B form a pair of recording tracks by sequentially storing the audio data D2A to D2H output from the audio data output circuit 18, 22 and 32 and outputting 2-channel recording audio data ADDT to generate 2-channel recording audio data ADDT, the recording magnetic heads 4A and 4B are placed behind the reproducing magnetic heads 6A and 6B, respectively, by a predetermined pitch so that, in the multichannel mode, the reproduced audio data DADT reproduced through the reproducing magnetic heads 6A and 6B can be recorded on the same area on the magnetic tape, and the audio output circuit 18, 22, 32 and/or audio data input circuit 16, 18, 26 output the reproduced audio data DADT and/or the audio data D2A and D2B with predetermined delay so that, in the 2-channel mode, the reproduced audio data DADT reproduced through the reproducing magnetic heads 6A and 6B is recorded at the same location.

This invention solves a third problem, by provision of a magnetic recording and/or reproducing apparatus 1 for recording a specific input data on a magnetic tape by helically sequentially forming a pair of recording tracks with plus and minus azimuth angles on magnetic tape, the $2^n$ (n: plus integer) channel input data is interleaved and multiplexed in every interleave cycle which is N times (N: plus integer) the cycle forming a pair of recording tracks, so as to sequentially record on the magnetic tape.

Further, the input data for is consisted of audio data which sampling is performed with a specific sampling cycle, and the interleave cycle is selected to be N times the cycle forming a pair of recording tracks such as to become integer times the sampling cycle.

Further, according to this invention, in a magnetic recording and/or reproducing apparatus 1 for helically sequentially recording a specific input data on the magnetic tape by forming a pair of recording tracks with plus and minus azimuth angles on the magnetic tape and reproducing the data recorded on the magnetic tape. In recoding $2^n$ channel input data is interleaved and multiplexed in every interleave cycle of N times the cycle forming a pair of recording tracks and sequentially recorded on magnetic tape by adding address data for which the value changes sequentially and circularly with the cycle during which a pair of recording tracks is formed, and in reproducing, the multiplexed input data is modulated to $2^n$ channel input data on the basis of the address data.

As described above, if the recording magnetic heads 4A and 4B are positioned behind the reproducing magnetic heads 6A and 6B, respectively, for at least 8.5+4N track pitch, even when the audio data ADDT and DADT are processed in every cycle of N times the cycle during which the reproducing magnetic heads 6A and 6B scan a pair of recording tracks and in every cycle of N times the cycle during which the recording magnetic heads 4A and 4B form a pair of recording tracks, the audio data can be recorded on the original recording tracks.

The recording magnetic heads 4A and 4B are positioned behind the reproducing magnetic heads 6A and 6B, respectively, by a predetermined track pitch so that, in the multichannel mode, the reproduced audio data DADT reproduced through the reproducing magnetic heads 6A and 6B can be recorded at the same location on the magnetic tape, while, in the 2-channel mode, the reproduced audio data DADT and/or the audio data D2A and D2B output from the audio data output circuit 18, 22 and 32 are output to these recording magnetic heads 4A and 4B by the audio data output circuit 18, 22 and 32 or the audio data input circuit 16, 18 and 26 with a predetermined delay. Thus, the write-after-read processing can be performed even if the operation mode is switched between the multichannel mode and the 2-channel mode.

If the $2^n$ channel input data is interleaved and multiplexed in every interleave cycle of N times the cycle F during which a pair of recording tracks is formed and is sequentially recorded on the magnetic tape, even when the cycle during which a pair of recording tracks is formed is not kept to an integer multiple of sampling of audio data, multichannel audio signal can be recorded.

In this invention, input data is modulated on the basis of frame data so as to modulate to the original channel correctly.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 1 is a table for explaining a conventional digital audio tape recorder;

FIGS. 4A to 4D are signal waveforms for explaining the recording and/or reproducing operation in the 32 [kHz] 4-channel mode;

FIGS. 5A to 5C are schematic diagrams for explaining the operation of the random access memory circuit in 44.1 [kHz] 4-channel mode;

FIGS. 6A to 6D are signal waveforms for explaining the recording and/or reproducing operation in the 44.1 [kHz] 4-channel mode;

FIGS. 7A to 7C are schematic diagrams for explaining the operation of the random access memory circuit in 48 [kHz] 4-channel mode;

FIGS. 8A to 8D are signal waveforms for explaining the recording and/or reproducing operation in the 48 [kHz] 4-channel mode;

FIGS. 9A to 9C are schematic diagrams for explaining the operation of the random access memory circuit in 32 [kHz] 8-channel mode;

FIGS. 10A to 10D are signal waveforms for explaining the recording and/or reproducing operation in the 32 [kHz] 8-channel mode;

FIG. 11 is a table for explaining a digital audio tape recorder according to this invention;

FIG. 17 is a table for explaining address data in writing; and

FIG. 18 is a table for explaining address data in reading.

DETAILED DESCRIPTION OF THE INVENTION

Preferred embodiments of this invention will be described with reference to the accompanying drawings:.

(1) General arrangement of embodiment

Figure 2:
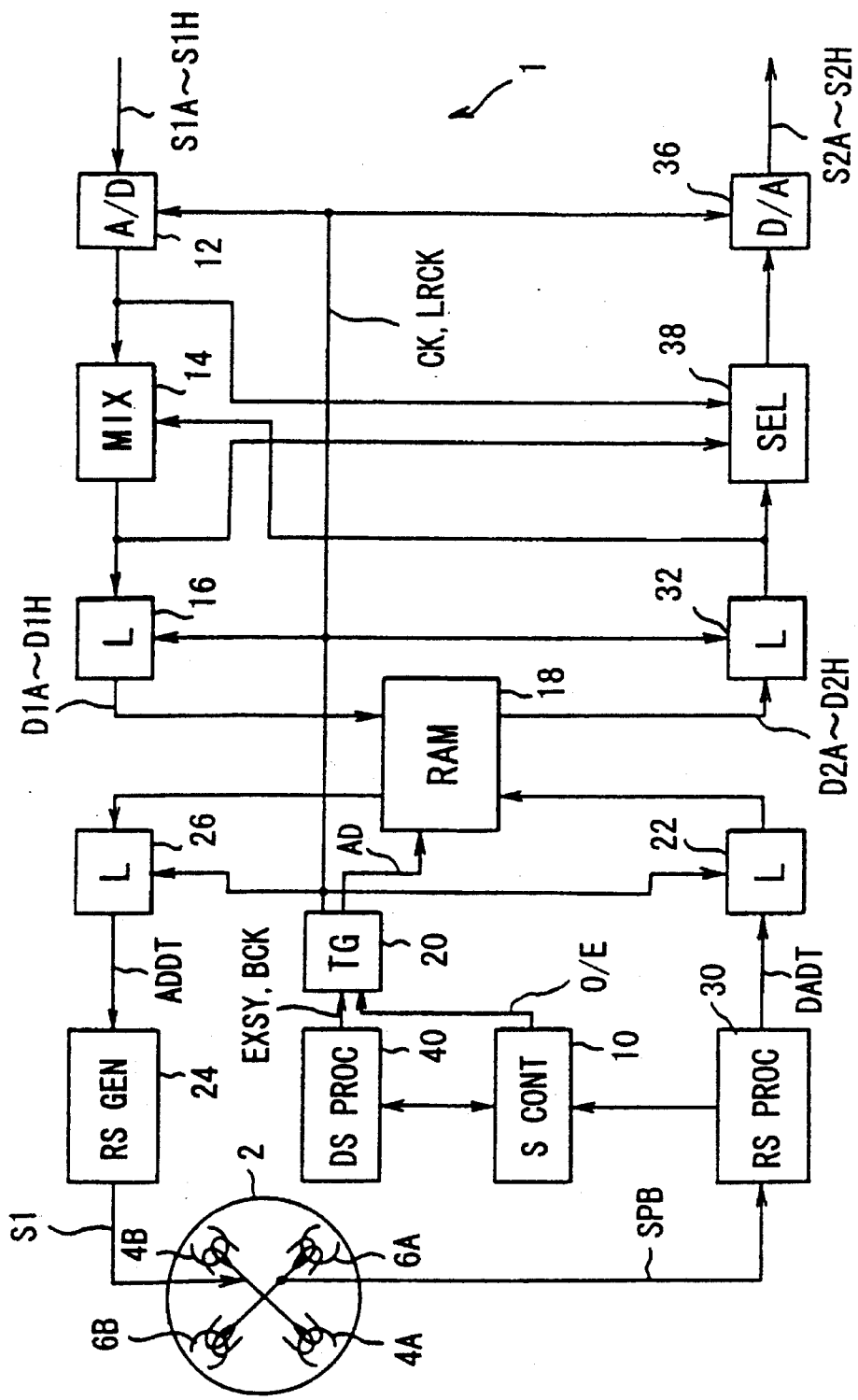
FIG. 2 is a block diagram showing a digital tape recorder according to one embodiment of this invention.

Referring to FIG. 2, 1 generally indicates a digital audio tape recorder in which recording magnetic heads 4A and 4B are mounted on a rotary drum 2 of 30 mm. in diameter with an angular interval of 180 degrees, and rotatably driven.

This digital audio tape recorder 1 is arranged to wind magnetic tape around the rotary drum 2 with a winding angle of 90 degrees or an overlap angle, and to be able to sequentially form recording tracks with plus and minus azimuth angles in a predetermined cycle in the recording mode by running the magnetic tape at a predetermined speed.

In the digital audio tape recorder 1, reproducing magnetic heads 6A and 6B are mounted on the rotary drum 2 with a predetermined difference in height relative to the recording magnetic heads 4A and 4B.

Hence, it is possible in the reproducing mode to reproduce digital audio signals by processing signals SPB reproduced by the reproducing magnetic heads 6A and 6B, and in the editing mode to process the reproduced digital audio signals, and then to record them again through the recording magnetic heads 4A and 4B.

The rotating speed of the rotary drum 2 and the running speed of the magnetic tape are controlled by a servo circuit (not shown) according to the operation mode of the digital audio tape recorder 1 based on control data output from a system control circuit 10. Thus, the digital audio tape recorder 1 can operate in various operation modes by switching the driving condition for the tape running system as required.

That is, in the normal operation mode, the digital audio tape recorder 1 can record or reproduce 2-channel digital audio signals in the standard or long recording and/or reproducing mode according to the format prescribed for the digital audio tape recorder, while, in the multichannel mode, it can record or reproduce 4- or 8-channel audio signals.

Thus, the digital audio tape recorder 1 can input or output audio signals up to eight channels.

In other words, the digital audio tape recorder 1 can input audio signals S1A to S1H of up to eight channels into an analog-digital converter circuit (A/D) 12, where they are converted into digital audio signals at a predetermined sampling frequency.

In the normal operation mode, the analog-digital converter circuit 12 changes over the sampling frequency based on the control data output from the system control circuit 10, and converts 2-channel audio signals S1A and S1B into digital audio signals D1A and D1B at the sampling frequency of 32 [kHz], 44.1 [kHz], or 48 [kHz].

On the other hand, in the multichannel mode, the analog-digital converter circuit 12 converts 4-channel audio signals S1A to S1D into digital audio signals D1A to D1D at the sampling frequency of 32 [kHz], 44.1 [kHz], or 48 [kHz], and 8-channel audio signals S1A to S1H into digital audio signals D1A to D1H at the sampling frequency of 32 [kHz].

Thus, in both the recording and editing modes, the analog-digital converter circuit 12 converts the audio signals S1A to S1H into the digital audio signals D1A to D1H, and then outputs them to a random access memory circuit (RAM) 18 through a mixer (MIX) 14, and a data latch circuit (L) 16.

Here, the random access memory circuit 18 sequentially stores address data AD output from a timing generator (TG) 20, and audio data output from the data latch circuits 16 and 22 according to identification data O/E output from the system control circuit 10, and outputs them in a predetermined order.

Here, in the normal operation mode, the data latch circuit 16 outputs the sequentially input 2-channel digital audio signals D1A and D1B as they are, while the random access memory circuit 18 similarly outputs the 2-channel digital audio signals ADDT (D1A and D1B) in the input order.

On the other hand, in the multichannel mode, the digital audio tape recorder 1 time division multiplexes 4- or 8-channel audio data into 2-channel data by sequentially latching the 4- or 8-channel audio data with the data latch circuit 16, and by sequentially and circularly sending such data into the random access memory circuit 18 by two channels.

The random access memory circuit 18 rearranges and outputs the 2-channel audio data ADDT in a predetermined order (hereinafter called "interleaving by the random access memory circuit"). Conversely, it arranges the 2-channel audio data DADT and outputs D2A and D2B in reproduction (hereinafter called "de-interleaving by the random access memory circuit").

Thus, when the digital audio tape recorder 1 records the digital audio signals on the magnetic tape in the recording or editing mode, it can sequentially record the audio signals S1A–S1H in a predetermined recording channel. It is arranged in the reproducing or editing mode to rearrange again the audio data DADT, which are reproduced in the rearranged order, to the original order.

Furthermore, as the sampling frequencies are switched by rearranging the order of data, the data latch circuit 16 and the random access memory circuit 18 time base compress and multiplex the audio data in recording in the multichannel mode, while the data latch circuit 22 and the random access memory circuit 18 time base expand and reproduce the time base compressed reproduced data to the original channels in reproduction in the multichannel mode.

The recording signal generator circuit 24 is a signal processing circuit which directly receives the 2-channel digital audio signals ADDT, and generates recording signals according to a format prescribed for the digital audio tape recorder. In this embodiment, it is arranged to be capable of processing not only the format prescribed for the digital audio tape recorder but also audio data in the multichannel mode by switching the operating frequencies.

Namely, the recording signal generator circuit 24 sequentially receives through the data latch circuit 26 the 2-channel audio data ADDT interleaved by the random access memory circuit 18, and separates them into blocks by the rotating cycle (that is, frame cycles) of the rotary drum 2.

Furthermore, the recording signal generator circuit 24 interleaves the blocked audio data one block after another in accordance with the standard of the digital audio tape recorder, appends error correction signals, subcodes and the like, converts them into recording signals, and outputs to the recording magnetic heads 4A and 4B.

This enables the digital audio tape recorder 1 in the recording or editing mode to input digital audio signals D1A and D1B, which have been converted into digital signals in the normal mode by the analog-digital converter circuit 12, to the recording signal generator circuit 24 in the order as they are, and to sequentially record the digital audio signals D1A and D1B on the magnetic tape according to the prescribed format.

On the other hand, in the multichannel mode, the digital audio tape recorder 1 can sequentially record digital audio signals in 4 or 8 channels on predetermined recording tracks in the recording or editing mode through interleaving by the random access memory circuit 18 and the recording signal generator circuit 24.

Similar to the recording signal generator circuit 24, a reproduce signal processing circuit 30 is a signal processing circuit which processes reproduced signals SPB according to the format prescribed for the digital audio tape recorder. In this embodiment, it is arranged to be capable of processing not only the format prescribed for the digital audio tape recorder but also audio data ADDT in the multichannel mode by switching the operating frequencies.

In the normal mode, the reproduced signal processing circuit 30 decodes the reproduced signals SPB, processes the error correction signals, and performs interleaving so as to deliver the 2-channel audio data DADT.

This enables the digital tape recorder 1, when reproducing magnetic tape recorded in the normal mode, to output the 2-channel audio data DADT from the reproduced signal processing circuit 30 in the order as they are through the data latch circuit 22, the random access memory circuit 18, and the data latch circuit 32 so that digital audio signals D2A and D2B can be reproduced.

On the other hand, in the multichannel mode, after the digital audio tape recorder 1 modulates and interleaves the reproduced data in the reproduced signal processing circuit 30, the processed reproduced signal is further de-interleaved with the random access memory circuit 18 so that the 4- or 8-channel digital audio signals D2A to D2H, which are assigned to and recorded on the predetermined recording tracks, can be reproduced.

Hence, digital audio signals D2A to D2H up to 8-channel are converted into analog signals S2A to S2H, and are outputted.

In outputting the audio signals S2A to S2H, the digital-analog converter circuit 36 is arranged to receive the digital audio signals through a selector (SEL) 38, which is then arranged to selectively output the digital audio signals D2A to D2H output from the data latch circuit 32, digital audio signals D1A to D1H output from the analog-digital converter circuit 12, or digital audio signals D1A to D1H output from the mixer 14.

This enables the digital audio tape recorder 1 to switch the type of digital audio signals which it can monitor as required, and to improve utility.

That is, in the recording mode, the audio signals S1A to S1H to be recorded can be monitored by selecting the digital audio signals D1A to D1H output from the analog-digital converter circuit 12, while, in the reproducing mode, reproduced signals can be monitored by selecting the digital audio signals D2A to D2H output from the data latch circuit 32.

On the other hand, the mixer 14 is arranged to, in the editing mode, merge and output the digital audio signals D1A to D1H output from the analog-digital circuit 12 with the digital audio signals D2A to D2H output from the data latch circuit 32, whereby the digital audio tape recorder 1 can perform the editing processing by applying a write-after-read technique for repeatedly using one reel of magnetic tape. In this editing mode, the editing operation can be ensured by causing the selector 38 to select and output the digital audio signals° output from the mixer 14.

The system control circuit 10 switches the overall operation in response to an operation by the user or based on subcode data or the like output from the reproduced signal processing circuit 30, and causes the digital audio tape recorder 1 to operate in a required operation mode as a whole.

In this case, the system control circuit 10 outputs identification data O/E to a timing generator 20 with reference to a frame address reproduced by the reproduced signal processing circuit 30, thereby controlling the operation of the random access memory circuit 18.

In addition, the system control circuit 10 drives a digital signal processing circuit 40, thereby outputting a reference signal EXSY synchronized to the rotating cycle of the rotary drum 2, a bit clock BCK and the like, from the digital signal processing circuit 40.

The timing generator 20 outputs address data for the random access memory circuit 18 with reference to the reference signal EXSY, the bit clock BCK, and the identification data O/E, and further outputs clocks CL, LRCK and the like as reference of the operation.

(2) Operation mode
(2-1) Normal operation mode

In the normal operation mode, the digital audio tape recorder 1 records or reproduces 2-channel audio signals according to a format prescribed for this type of digital audio tape recorder.

To this end, the system control circuit 10 switches the operation of the digital signal processing circuit 40, and sets the cycle of the reference signal EXSY to 30 [msec] and 60 [msec] for a normal time mode and a long time mode, respectively.

This causes the system control circuit 10 to set the cycle for forming a pair of recording tracks (that is, one frame cycle being F) to 30 [msec] and 60 [msec] for the normal time mode and the long time mode, respectively. In recording, the recording signal generator circuit 24 sequentially interleaves the 2-channel audio data ADDT with this cycle as a unit, and corrects any error therein.

On the other hand, in recording, the random access memory circuit 18 holds the 2-channel digital audio signals, which sequentially come in, for a predetermined period of time, and then outputs them. In addition, the analog-digital converter circuit 12 samples the 2-channel audio signals with reference to the clock signal CK to generate digital audio signals with the sampling frequency of 32 [kHz], 44.1 [kHz], or 48 [kHz].

This enables the digital audio tape recorder 1 to form a pair of recording tracks in the cycle of 30 [msec] or 60 [msec] for the normal time mode or the long time mode, respectively, and to sequentially record the 2-channel digital audio signals D1A and D1B.

On the other hand, in reproducing, the servo circuit rotatably drives the rotary drum 2 so as to synchronize with the reference signal EXSY, and tracking controls the capstan motor. In response to this, the reproduced signal processing circuit 30 processes the reproduced signals SPB, which are sequentially reproduced in synchronization with the reference signal EXSY, and outputs 2-channel audio data DADT.

The random access memory circuit 18 sequentially outputs the 2-channel audio data DADT, which are sequentially input as in recording, in the order as they are, while the digital-analog converter circuit 36 sequentially converts the 2-channel audio data into analog signals S2A and S2B, and outputs them.

This enables the digital audio tape recorder 1 to sequentially output the 2-channel audio signals S2A and S2B recorded in the format prescribed for this type of digital audio tape recorder 1.

Further, in the editing mode, the digital audio tape recorder 1 causes the recording signal generator circuit 24 and the reproduced signal processing circuit 30 to operate in the recording and editing modes in the similar manner, and the random access memory circuit 18 to time divide the audio data ADDT and DADT.

Furthermore, the digital audio tape recorder 1 edits with the mixer 14 the audio data D2A and D2B output from the data latch circuit 32 in this state, and outputs to the random access memory circuit 18, whereby the write-after-read processing can be performed on the 2-channel audio signals recorded in the format prescribed for this type of digital audio tape recorder.

(2-2) 32 [kHz] 4-channel mode

After the user sets the number of channels to 4 channels and the sampling frequency to 32 [kHz], the digital audio tape recorder 1 is switched to the 32 [kHz] 4-channel mode, and records or reproduces digital audio signals according to the format prescribed for this 32 [kHz] 4-channel mode.

That is, in this mode, because one frame cycle is 30 [msec], the system control circuit 10 set the cycle of the reference signal EXSY as in the case where the normal time mode in the ordinary operation is selected so that a pair of recording tracks can be formed in a cycle of 30 [msec].

In the recording and editing modes, the analog-digital converter circuit 12 converts and outputs the 4-channel audio signals S1A to S1D into digital audio signals D1A to D1D at the sampling frequency of 32 [kHz].

Figures 3A, 3B, 3C:
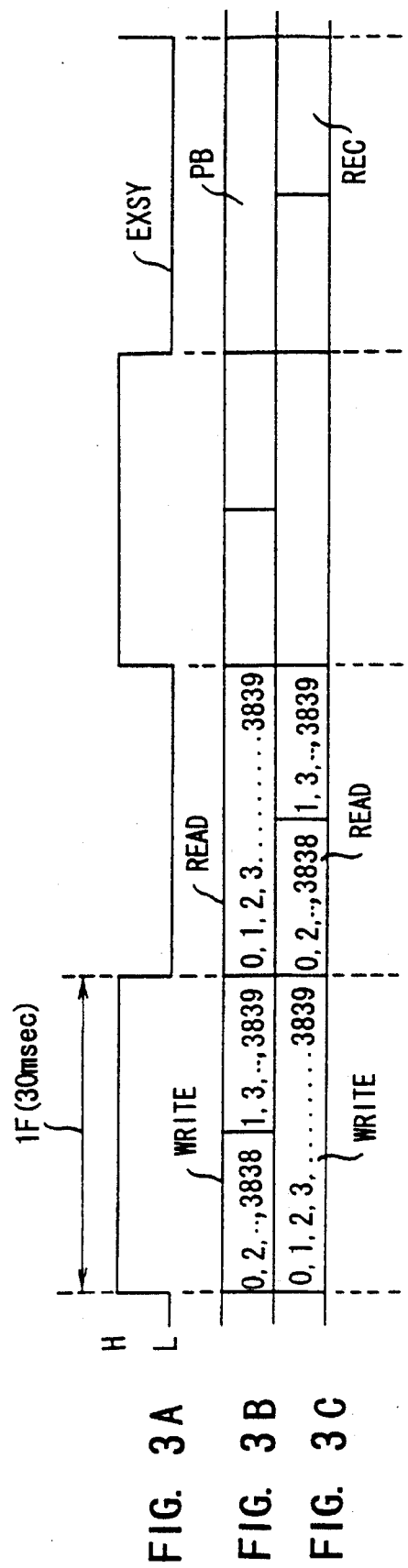
FIGS. 3A to 3C are schematic diagrams for explaining the operation of a random access memory circuit in 32 [kHz] 4-channel mode.
Figures 12A, 12B, 12C, 12D:
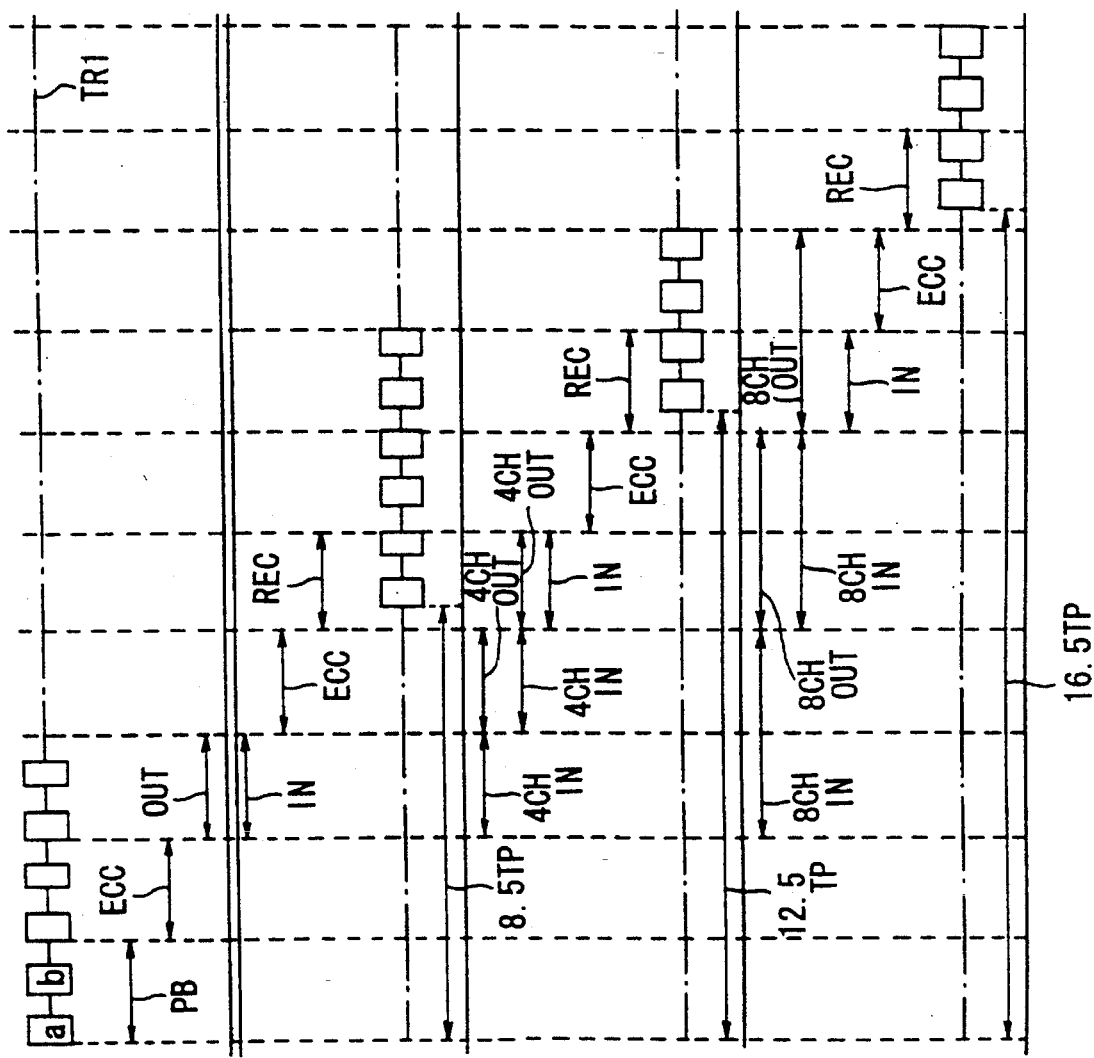
FIGS. 12A to 12D are schematic diagrams for explaining editing mode.

As shown in FIGS. 3A to 3C, in the recording and editing modes, the data latch circuit 16 and the random access memory circuit 18 rearrange sequentially input audio data, and convert and output the 4-channel audio data D1A to D1D at the sampling frequency of 32 [kHz] into 2-channel audio data ADDT at the sampling frequency of 64 [kHz].

Here, FIGS. 3A to 3C show data input and output of the random access memory circuit 18 with reference to the reference signal EXSY (FIG. 3A). In recording (represented by a reference REC) (FIG. 3C), the random access memory circuit sequentially stores the audio data as numbered by 0, 1, 2, 3, ..., 3839, which are sequentially and consecutively input in an order of the audio data of the first and second channels (represented by numeral 0), those of the third and fourth channel (represented by numeral 1), and those of the first and second channels (represented by numeral 2), ... in the order of their input.

Furthermore, in recording, the random access memory circuit 18 outputs the stored audio data as numbered by 0, 2, ..., 3838, and 1, 3, ..., 3839 in correspondence to the numbers when they are stored, in the order of audio data of the first and second channels (represented by numeral 0), those of the first and second channels (represented by numeral 2), ..., and those of the third and fourth channels (represented by numeral 1), those of the third and fourth channels (represented by numeral 3), ...

Thus, as similarly shown in FIGS. 4A to 4D with reference to the reference signal EXSY (FIG. 4A), the digital audio tape recorder 1 performs interleaving again with the recording signal generator circuit 24 to generate a recording signal S1 (FIG. 4B), whereby the leading track of the pair of recording tracks is formed by first recording the audio data of the first and second channels (represented by references A and B) and then by recording the audio data of the third and fourth channels (represented by references C and D), and then the trailing recording track is formed by recording the audio data of the third and fourth channels and those of the first and second channels.

Thus, the random access memory circuit 18 generates the 2-channel audio data ADDT for the 4-channel audio data (FIG. 4D) by rearranging the data as described earlier so that the audio data for the first and second channels and those for the third and fourth channels are consecutive in the first and second halves of one frame cycle (FIG. 4C).

Correspondingly, the recording signal generator circuit 24 converts the audio data ADDT into recording signals S1 at an operating speed two times faster than that in the ordinary mode at the sampling frequency 32 [kHz] so that the digital audio tape recorder 1 can record the 32 [kHz] 4-channel digital audio signals D1A to D1D according to the specification.

On the other hand, in reproduction, the digital audio tape recorder 1 operates the reproduced signal processing circuit 30 at an operating speed two times faster than that of the ordinary mode at the sampling frequency 32 [kHz], thereby sequentially reproducing the audio data DADT in which the audio data of the first and second channels, those of the third and fourth channels, those of the third and fourth channels, and those of the first and second channels are consecutive (FIG. 4C).

As shown in FIG. 3B, in contrast to recording, the random access memory circuit 18 stores the audio data DADT as numbered by 0, 2, . . . , 3838, and 1, 3, . . . , 3839 in the order of the audio data of the first and second channels (represented by numeral 0), those of the first and second channels (represented by numeral 2), . . . , and those of the third and fourth channels (represented by numeral 1), those of the third and fourth channels (represented by numeral 4), . . . ; and then outputs them as numbered by 0, 1, 2, 3, . . . , 3839 in the order of the audio data of the first and second channels (represented by numeral 0), those of the third and fourth channels (represented by numeral 1), those of the first and second channels (represented by numeral 2), . . . , thereby reproducing the audio data as recorded through the data latch circuit 32.

Thus, the 4-channel audio signals S2A to S2D can be reproduced by converting the reproduced 4-channel digital audio signals D2A to D2D into analog signals with the digital-analog converter circuit 36 and outputting them, whereby the digital audio tape recorder 1 can record or reproduce the 32 [kHz] 4-channel digital audio signals by operating the recording signal generator circuit 24 and the reproduced signal processing circuit 30, which are applied to an ordinary digital audio tape recorder, at a two times higher frequency.

In the editing mode, the digital audio tape recorder 1 is arranged to be capable of performing the write-after-read processing even in the 32 [kHz] 4- channel mode by operating the recording signal generator circuit 24 and the reproduced signal processing circuit 30 in the same manner as in the case of recording/reproduction, and by editing with the mixer 14.

(2-3) 44.1 [kHz] 4-channel mode

The digital audio tape recorder 1 is switched to 44.1 [kHz] 4-channel mode when the user sets the number of channels to four, and then the sampling frequency to 44.1 [kHz].

As shown in FIG. 5A with reference to the reference signal EXSY, in this mode, the digital audio tape recorder 1 sets one frame cycle F to 15 [msec], thereby forming a pair of recording tracks in a cycle of 15 [msec] one half in the case of the normal format at 44.1 [kHz].

Furthermore, in the recording mode, the analog-digital converter circuit 12 converts and outputs 4-channel audio signals S1A to S1D into digital audio signals D1A to D1D at the sampling frequency of 44.1 [kHz]. The data latch circuit 16 and the random access memory circuit 18 rearrange and multiplex the order of sequentially input audio signals in the recording and editing modes, thereby converting and outputting the 4-channel audio data at the sampling frequency 44.1 [kHz] into 2-channel audio data DADT at the sampling frequency 88.2 [kHz].

At the moment, the random access memory circuit 18 interleaves in a unit of two frames the sequentially input audio data so that, even when the cycle for forming a pair of recording tracks is not maintained at integer multiple of the sampling cycle of each of audio data D1D to D1D, the 4-channel audio data D1A to D1D at the sampling frequency of 44.1 [kHz] can be recorded or reproduced by operating the recording signal generator circuit 24 and the reproduced signal processing circuit 30 at a two-fold operating speed.

That is, when the sequentially input audio data D1A to D1D is interleaved for every two frames, the following equation can be obtained by processing the audio data at 30 [msec].

$$30 \text{ [msec]} \times 44.1 \text{ [kHz]} = 1323 \text{ [sample/2 frame]} \quad (3)$$

Thus, it is found that the sequentially input audio data D1A to D1D can be assigned and recorded on each recording track.

In such recording, the digital audio tape recorder 1 causes the random access memory circuit 18 to perform interleaving so that the audio data of the first and second channels and those of the third and fourth channels are assigned to the first and second recording tracks of the pair of recording tracks, respectively.

That is, in the recording mode, the random access memory circuit 18 sequentially stores the audio data ADDT as numbered by 0, 1, 2, 3, . . . , 5290, 5291 which are continuously input in the order of the audio data of the first and second channels (represented by numeral 0), those of the third and fourth channels (represented by numeral 1), those of the first and second channels (represented by numeral 2), . . . (FIG. 5C).

Furthermore, in the recording mode, the random access memory circuit 18 outputs the stored audio data ADDT as numbered by 0, 2, 4, . . . , 5290, and 1, 3, . . . , 5291 in correspondence to the numbers of 0, 1, 2, 3, . . . , 5290, 5291 when they are input in the order of the audio data of the first and second channels (represented by numeral 0), those of the first and second channels (represented by numeral 2), those of the first and second channels (represented by numeral 4), . . . , and those of the third and fourth channels (represented by numeral 1), those of the third and fourth channels (represented by numeral 3), . . . , thereby assigning the audio data of the first and the second channels to the first one of two frames to be interleaved by the random access memory circuit 18, and the audio data of the third and fourth channels to the succeeding second one.

As shown in FIGS. 6A to 6D with reference to the reference signal EXSY (FIG. 6A), in correspondence to the audio data ADDT (FIG. 6C), the recording signal generator circuit 24 converts the audio data ADDT into a recording signal S1 at an operating speed two times higher than that of the ordinary mode at the sampling frequency 44.1 [kHz] (FIG. 6C), whereby the audio data of the first and second channels are assigned and recorded on a pair of recording tracks which are formed in the first one frame, while the audio data of the third and fourth channels are assigned and recorded on a pair of recording tracks which are formed in the succeeding second one frame (FIGS. 6B and 6D).

On the other hand, in reproduction, the digital audio tape recorder 1 operates the reproduced signal processing circuit 30 at an operating speed two times higher than that at the normal sampling frequency of 44.1 [kHz], thereby reproducing the audio data DADT in which the audio data of the first and second channel continue for one frame cycle followed by the audio data of the third and fourth channels continuing for one frame cycle (FIG. 6C).

By the way, in the digital audio tape recorder 1, it is arranged that the recording signal generator circuit 24 and the reproduced signal processing circuit 30 perform interleaving and error correction for each frame, whereby the recording signal S1 and the audio data DADT are output with a delay of predetermined cycles to the audio data ADDT and the reproduced signal SPB.

As shown in FIG. 5B, in contrast to recording, the random access memory circuit 18 stores the reproduced audio data DADT as numbered by 0, 2, . . . , 5290, and 1, 3, . . . , 5291 in the order of the audio data of the first and second channels (represented by numeral 0), those of the first and second channels (represented by numeral 2), . . . , and those of the third and fourth channels (represented by numeral 1), those of the third and fourth channels (represented by numeral 3) . . . ; and then outputs them as numbered by 0, 1, 2, 3, . . . , 5290, 5291 in the order of the audio data of the first and second channels (represented by numeral 0), those of the third and fourth channels (represented by numeral 1), those of the first and second channels (represented by numeral 2), . . . , thereby reproducing the audio data as recorded through the data latch circuit 32.

Thus, the 44.1 [kHz] 4-channel digital audio signals can also be recorded or reproduced by causing the random access memory circuit 18 to perform interleaving every two-frame cycle so as to operate the recording signal generator circuit 24 and the reproduced signal processing circuit 30, which are applied to an ordinary digital audio tape recorder, at a two times higher frequency.

However, in the case where, in every two frames, the audio data of the first and second channels are assigned and recorded on the pair of recording tracks formed in the first one frame, and the audio data of the third and fourth channels are assigned and recorded on the pair of recording tracks formed in the succeeding second one frame, it is necessary in reproduction to identify the first one frame and the second one frame.

That is, if the first and second frames are erroneously processed, audio signals S1A and S1B assigned and recorded on the first and second channels, and audio signals S1C and S1D assigned and recorded on the third and fourth channels are reproduced as audio signals S2C and S2D for the third and fourth channels and audio signals S2A and S2B for the first and second channels, respectively.

Thus, in this embodiment, the system control circuit 10 is arranged to detect the frame address of the reproduced audio data and to output the least significant bit of the frame address to the timing generator 20 as the identification data O/E so that the correct channel can be demodulated.

Practically, such type of digital audio tape recorder 1 is arranged to record as a subcode the frame data which sequentially and circularly varies in every one frame its value in a range of 0 to 16. This enables the digital audio tape recorder 1 to accurately reproduce multichannel audio data using the frame data in this subcode as the reference.

In the editing mode, the digital audio tape recorder 1 is arranged to be capable of performing the write-after-read processing even in the 44.1 [kHz] 4- channel mode by operating the recording signal generator circuit 24 and the reproduced signal processing circuit 30 in the same manner as in the case of recording and/or reproducing, and by editing with the mixer 14.

(2-4) 48 [kHz] 4-channel mode

The digital audio tape recorder 1 is switched to 48 [kHz] 4-channel mode when the user sets the number of channels to four, and then the sampling frequency to 48 [kHz].

As shown in FIGS. 7A to 7C with reference to the reference signal EXSY (FIG. 7A), in this mode, the digital audio tape recorder 1 sets one frame cycle F to 15 msec, thereby forming a pair of recording tracks in a cycle of 15 [msec] one half in the case of the normal format at 48 [kHz].

Furthermore, in the recording mode, the analog-digital converter circuit 12 converts and outputs 4-channel audio signals S1A to S1D into digital audio signals D1A to D1D at the sampling frequency of 48 [kHz]. The data latch circuit 16 and the random access memory circuit 18 rearrange and multiplex the order of sequentially input audio signals in the recording and editing modes, thereby converting and outputting the 4-channel audio data at the sampling frequency 48 [kHz] into 2-channel audio data ADDT at the sampling frequency 96 [kHz].

At the moment, as in the case of 44.1 [kHz] 4-channel mode, the random access memory circuit 18 interleaves in a unit of two frames the sequentially input audio data so that the 4-channel audio data at the sampling frequency of 48 [kHz] can be recorded or reproduced by operating the recording signal generator circuit 24 and the reproduced signal processing circuit 30 at a two-fold operating speed.

That is, in the case of sampling frequency at 48 [kHz], as the cycle for forming a pair of recording tracks is maintained at integer multiples of the sampling cycle for each audio data, 4-channel audio signals can be recorded or reproduced even when the audio data is processed by frame as in the 32 [kHz] 4-channel mode.

However, with such approach, it is necessary to switch the processing procedure of the random access memory circuit 18 from that for the 44.1 [kHz] 4-channel mode.

The 32 [kHz] mode is a mode in which the audio data is 12-bit non-linear quantized to extend the recording time, while the 44.1 and 48 [kHz] modes are modes in which the audio data is processed through 16-bit linear quantization.

Therefore, the digital audio tape recorder 1 must change the processing of audio data between the 32 [kHz] mode, and the 44.1 [kHz] and 48 [kHz] modes. In this case, if it is intended to change over the processing between the 44.1 [kHz] and 48 [kHz] 4-channel modes, there arises a shortcomings that the entire configuration becomes further complicated.

Therefore, this embodiment is designed to simplify the entire configuration by processing the audio data in the 48 [kHz] 4-channel mode in the same manner as in the 44.1 [kHz] 4-channel mode.

This enables it to further improve the utility because 32 [kHz] 8-channel mode can be set to the 32 [kHz] 4-channel mode in the same manner that the 48 [kHz] 4-channel mode is set to the 48 [kHz] 2-channel mode.

That is, as in the 44.1 [kHz] 4-channel mode, in the recording mode, the random access memory circuit 18 sequentially stores the audio data ADDT as numbered by 0, 1, 2, 3, . . . , 5758, 5759 which is continuously input in the order of the audio data of the first and second channels (represented by numeral 0), those of the third and fourth channels (represented by numeral 1), those of the first and second channels (represented by numeral 2), . . . (FIG. 7C).

In this case, it should be noted that, as the sampling frequency differs from that of the 44.1 [kHz] 4-channel mode, the number of samples in two frames is larger than that in FIGS. 5A to 5C.

Furthermore, in the recording mode, the random access memory circuit 18 outputs the stored audio data ADDT as numbered by 0, 2, 4, . . . , 5758, and 1, 3, . . . , 5759 in correspondence to the numbers of 0, 1, 2, 3, . . . , 5758, 5759 when they are input in the order of the audio data of the first and second channels (represented by numeral 0), those of the first and second channels (represented by numeral 2), those of the first and second channels (represented by numeral 4), . . . , and those of the third and fourth channels (represented by numeral 1), those of the third and fourth channels (represented by numeral 3), . . . , thereby assigning the audio data of the first and the second channels to the first one of two frames to be interleaved by the random access memory circuit 18, and the audio data of the third and fourth channels to the succeeding second one.

Thus, as shown in FIGS. 8A to 8D with reference to the reference signal EXSY (FIG. 8A), in correspondence to the audio data ADDT (FIG. 8C), the recording signal generator circuit 24 converts the audio data ADDT into a recording signal at an operating speed two times higher than that of the normal mode at the sampling frequency 48 [kHz], whereby the audio data of the first and second channels are assigned and recorded on a pair of recording tracks which are formed in the first one frame, while the audio data of the third and fourth channels are assigned and recorded on a pair of recording tracks which are formed in the succeeding second one frame (FIGS. 8B and 8D).

In reproduction, the digital audio tape recorder 1 operates the reproduced signal processing circuit 30 at an operating speed two times higher than that at the normal sampling frequency of 48 [kHz], thereby reproducing the audio data DADT in which the audio data of the first and second channel continue for one frame cycle followed by the audio data of the third and fourth channels continuing for one frame cycle (FIG. 7C).

As shown in FIG. 7B, in contrast to recording, the random access memory circuit 18 stores the reproduced audio data DADT as numbered by 0, 2, . . . , 5758, and 1, 3, . . . , 5759 in the order of the audio data of the first and second channels (represented by numeral 0), those of the first and second channels (represented by numeral 2), . . . , and those of the third and fourth channels (represented by numeral 1), those of the third and fourth channels (represented by numeral 3) . . . ; and then outputs them as numbered by 0, 1, 2, 3, . . . , 5758, 5759 in the order of the audio data of the first and second channels (represented by numeral 0), those of the third and fourth channels (represented by numeral 1), those of the first and second channels (represented by numeral 2), . . . , thereby reproducing the audio data as recorded through the data latch circuit 32.

Thus, 48 [kHz] 4-channel digital audio signals can also be recorded or reproduced by processing them as in the 44.1 [kHz] 4-channel mode, and the write-after-read processing can also be performed.

(2-5) 32 [kHz] 8-channel mode
(2-5) 32 [kHz] 8-channel mode

The digital audio tape recorder 1 is switched to 32 [kHz] 8-channel mode, and sets one frame cycle F to 15 msec when the user sets the number of channels to eight as shown in FIGS. 9A to 9C with reference to the reference signal EXSY (FIG. 9A).

In the recording mode, the analog-digital converter circuit 12 converts and outputs 8-channel audio signals S1A to S1H into digital audio signals D1A to D1H at the sampling frequency of 32 [kHz]. The data latch circuit 16 and the random access memory circuit 18 rearrange and multiplex the order of sequentially input audio signals in the recording and editing modes, thereby converting and outputting the 8-channel audio data at the sampling frequency 32 [kHz] into 2-channel audio data ADDT at the sampling frequency 128 [kHz].

At the moment, as in the case of 44.1 [kHz] and 48 [kHz] 4-channel modes, the random access memory circuit 18 interleaves in an unit of two frames the sequentially input audio data so that the 8-channel audio data signals D1A to D1H at the sampling frequency of 32 [kHz] can be recorded or reproduced by operating the recording signal generator circuit 24 and the reproduced signal processing circuit 30 at a operating speed two times faster than in the normal 32 [kHz] 4-channel mode.

That is, the random access memory circuit 18 sequentially and circulatingly takes in audio data from the data latch circuit 16, then inputs the audio data ADDT in the order of the audio data of the first and second channels, those of the third and fourth channels, those of the fifth and sixth channels, those of the seventh and eighth channels, those of the first and second channels, . . . , and sequentially stores them in the order of input as numbered by 0, 1, 2, 3, . . . , 7678, and 7679 (FIG. 9C).

Here, it should be noted that, as the sampling frequency is 32 [kHz], and the number of channels is eight, the number of samples in an unit of two frames is 7679.

Furthermore, in the recording mode, the random access memory circuit 18 outputs the stored audio data ADDT as numbered by 0, 4, . . . , 7676, 1, 5, . . . , 7677, 2, 6, . . . , 7678, and 3, 7, . . . , 7679 in correspondence to the numbers of 0, 1, 2, 3, . . . , 7678, and 7679 when they are input so that the audio data of the first and second channels continue for ½ frame cycle, followed by the audio data of the third and fourth channels for ½ frame cycle, then the audio data of the fifth and sixth channels, and those of the seventh and eighth channels for ½ frame cycle, respectively.

Thus, as shown in FIGS. 10A to 10D with reference to the reference signal EXSY (FIG. 10A), in correspondence to the audio data ADDT (FIG. 10C), the recording signal generator circuit 24 converts the audio data ADDT into a recording signal S1 at an operating speed two times higher than that of the 4-channel mode at the sampling frequency 32 [kHz], whereby the audio data of the first and second channels and those of the third and fourth channels are assigned and recorded on the prior half and the latter half, respectively, which are formed by further dividing the first one frame, while the audio data of the fifth and sixth channels and those of the seventh and eighth are assigned and recorded on the prior half and the latter half, respectively, which are formed by further dividing the succeeding second one frame (FIGS. 10B and 10D).

In reproduction, the digital audio tape recorder 1 operates the reproduced signal processing circuit 30 at an operating speed two times higher than that at the 4-channel mode at the sampling frequency of 32 [kHz], thereby reproducing the audio data DADT in which the audio data of the first and second channel continue for ½ frame cycle followed by the audio data of the third and fourth channels, those of the fifth and sixth, and those of seventh and eighth continuing for ½ frame cycle, respectively (FIG. 10C).

As shown in FIG. 9B, the random access memory circuit 18 sequentially stores the audio data DADT as numbered by 0, 4, ..., 7676, 1, 5, ..., 7677, 2, 6, ..., 7678, and 3, 7, ..., 7679 in which the audio data of the first and second channels, those of the third and fourth channels, those of the fifth and sixth channels, those of the seventh and eighth channels are continues for ½ frame cycle, respectively, and outputs them as numbered by 0, 1, 2, 3, ..., 7678, 7679 in the order of the audio data of the first and second channels, those of the third and fourth channels, those of the fifth and sixth channels, those of the seventh and eighth channels, those of the first and second channels, ..., thereby reproducing the audio data as recorded through the data latch circuit 32.

Thus, the 32 [kHz] 8-channel digital audio signals can also be recorded or reproduced as in the 44.1 [kHz] 4-channel mode by interleaving the audio data every two-frame cycle, and write-after-read can also be performed. A table corresponding to this invention is shown in FIG. 11 in which the column of 4000 [rpm] shown in bole frame represents as the case of this invention.

With the above constitution, the audio data is processed by interleave processing with 2 frames in the random access memory circuit 18, so that even if the cycle forming a pair of recording tracks is not kept to a multiple of integer of sampling frequency of each audio data, regarding sampling frequency 44.1 [kHz] 4-channel audio signal can be recorded and reproduced.

(3) Control of memory circuit

In the digital audio tape recorder 1, the recording magnetic heads 4A and 4B are disposed in such a manner that they scan recording tracks following the reproducing magnetic heads 6A and 6B by a predetermined number of tracks.

Thus, the digital audio tape recorder 1 can edit a desired channel after decoding the audio data reproduced by the reproducing magnetic heads 6A and 6B, and then record them with the recording magnetic heads. 4A and 4B. Namely, it can perform the write- after-read processing.

Therefore, the system control circuit 10 is arranged in the editing mode to activate the reproduced signal processing circuit 30 and the recording signal generator circuit 24, thereby sequentially processing the reproduced signal SPB output from the reproducing magnetic heads 6A and 6B, and sequentially recording the audio data ADDT.

That is, the digital audio tape recorder 1 inputs 2- channel audio data DADT output from the reproduced signal processing circuit 30 into the random access memory circuit 18 where, in the multichannel mode, original multiple channels are reproduced. Furthermore, the digital audio tape recorder 1 outputs thus restored multichannel audio data to the mixer 14 where they are edited for a channel desired by the user, and are mixed with audio data output from the analog-digital converter circuit 12.

Furthermore, the digital audio tape recorder 1 converts the audio data output from the mixer 14 into 2-channel audio data ADDT through the random access memory circuit 18, and records this audio data ADDT through the recording signal generator circuit 30.

In this case, the system control circuit 10 switches the operation of the random access memory circuit 18 by switching the operation of timing generator 20 for recording and reproducing on time division basis, thereby sharing the memory circuit necessary in the recording and the reproducing systems for time base compression and expansion, interleaving and de-interleaving to simplify the entire configuration.

By the way, such type of digital audio tape recorder is designed to perform interleaving and error correction by utilizing as an unit a cycle of the magnetic head during which a pair of recording tracks is formed in the normal operation mode.

Therefore, as shown in FIGS. 12A to 12D, in reproducing audio data recorded on a pair of recording tracks designated by the references "a" and "b" (FIG. 12A), the reproduced signal SPB is obtained from the recording tracks "a" and "b" by the reproducing magnetic heads 6A and 6B in the first one cycle (represented by a reference PB), and error corrected in the succeeding one frame cycle (represented by a reference ECC).

Furthermore, the digital audio tape recorder 1 de-interleaves and outputs error-corrected audio data in the succeeding one frame cycle (represented by a reference OUT).

On the other hand, in a case where the output audio data is directly input into the recording signal generator circuit 24 for recording without any processing (FIG. 12B), the digital audio tape recorder 1 inputs the audio data into the recording system and interleaves them in one frame cycle where they are de-interleaved and output (represented by a reference IN), and generates an error correction code in the succeeding one frame cycle (represented by a reference ECC).

Furthermore, in this case, the digital audio tape recorder 1 converts the audio data together with the error correction code and subcodes into a recording signal S1 in the succeeding one frame cycle, and outputs to the recording magnetic heads 4A and 4B (represented by a reference REC).

Thus, it will be appreciated that, in the editing mode where the reproduced audio data is directly inputted into the recording signal generator circuit 24 for recording without any processing by the reproduced signal processing circuit 30, the reproduced audio data can be recorded again in the same recording track by disposing the recording magnetic heads 4A and 4B behind the reproducing magnetic heads 6A and 6B by at least 8.5 track pitch TP.

Thus, in such type of digital audio tape recorder 1, when the write-after-read processing of 2-channel audio signals is performed in the normal operation mode, it is necessary to dispose the recording magnetic heads 4A and 4B behind the reproducing magnetic heads 6A and 6B by at least 8.5 track pitch TP.

On the other hand, when the audio data output from the reproduced signal processing circuit 30 is time base expanded by the random access memory circuit 18, the recording and/or reproducing system takes much time for processing by that amount.

That is, for audio data time base compressed and multiplexed in an unit of one frame by the random access memory circuit 18 (FIG. 12C), the audio data DADT output from the reproduced signal processing circuit 30 is input into the random access memory circuit 18 in an unit of one frame (represented by a reference 4chIN), and then decoded into and output as 4-channel audio data in the succeeding one frame cycle (represented by a reference 4chOUT).

In addition, in the editing mode, the 4-channel audio data is input into the random access memory circuit 18 (represented by a reference 4chIN), then time base compressed in the succeeding one frame Cycle, and output to the reproduced signal processing circuit 24 (represented by a reference 4chOUT).

Thus, the audio data time base compressed and multiplexed in an unit of one frame can be recorded again in the same recording track by disposing the recording magnetic heads 4A and 4B behind the reproducing magnetic heads 6A and 6B by 12.5 track pitch TP.

Thus, in such type of digital audio tape recorder 1, when the write-after-read processing is performed in the 32 [kHz]

4- channel mode, it is necessary to dispose the recording magnetic heads 4A and 4B behind the reproducing magnetic heads 6A and 6B by at least 12.5 track pitch TP.

On the other hand, for audio data time base compressed and multiplexed in an unit of two frames (FIG. 12D), the audio data DADT output from the reproduced signal processing circuit 30 is input into the random access memory circuit 18 in an unit of two frames (represented by a reference 8chIN), and then decoded into and output as 4- or 8-channel audio data in the succeeding two frame cycle (represented by a reference 8chOUT).

In addition, in the editing mode, the 4- or 8-channel audio data is input into the random access memory circuit 18 (represented by a reference 8chIN), then time base compressed in the succeeding two frame cycle, and output to the reproduced signal processing circuit 24 (represented by a reference 8chOUT).

Thus, the audio data time base compressed and multiplexed in an unit of two frames can be recorded again in the same recording track by disposing the recording magnetic heads 4A and 4B behind the reproducing magnetic heads 6A and 6B by 16.5 track pitch TP.

Thus, in such type of digital audio tape recorder 1, when the write-after-read processing is performed in the 44.1 [kHz] 4-channel mode, the 48 [kHz]4-channel mode, or the 32 [kHz] 8-channel mode, it is necessary to dispose the recording magnetic heads 4A and 4B behind the reproducing magnetic heads 6A and 6B by at least 16.5 track pitch TP.

Therefore, it can be understood that, the digital audio tape recorder 1, when the random access memory circuit 18 performs interleaving in an unit of N frames, the audio data output D2A to D2H from the random access memory circuit 18 can be recorded on the original recording track by disposing the recording magnetic heads 4A and 4B behind the reproducing magnetic heads 6A and 6B with the head level difference m represented by the following equation.

$$m=(8.5+4N) \ [TP] \quad (4)$$

That is, when the magnetic heads 4A to 6B are disposed as described above, the write-after-read processing can be performed in each operation mode without providing a dedicated buffer memory circuit or the like for time matching.

In a case where, in a multichannel digital audio tape recorder, the write-after-read processing is performed by switching the number of channels, if the recording and reproducing magnetic heads are prepared in the number for such head level difference, the arrangement of the rotary drum becomes complicated by that amount and not suitable for practical use.

Figure 13:
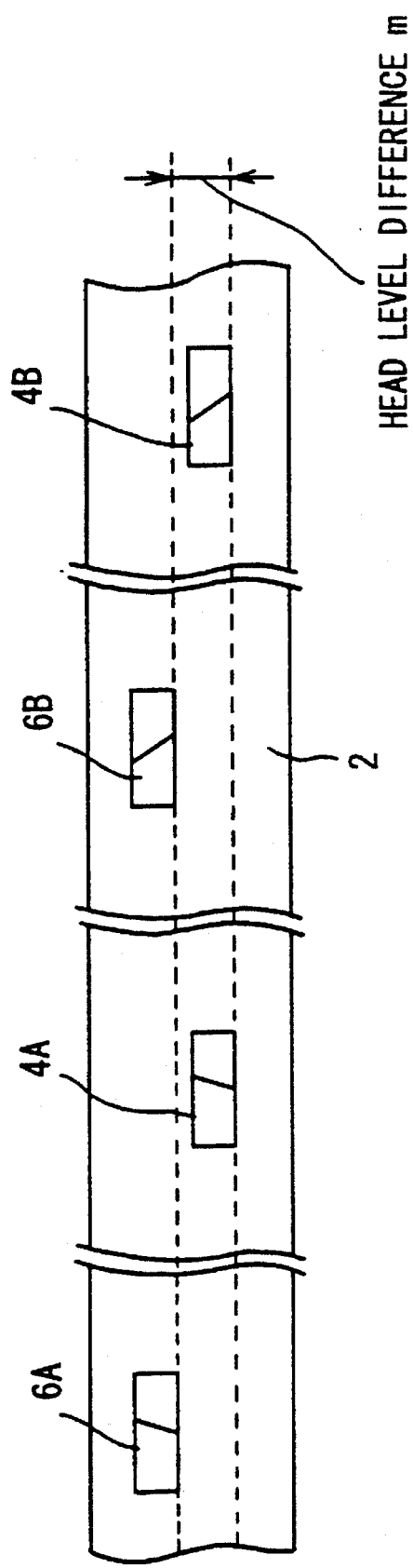
FIG. 13 is a schematic diagram showing the head level difference.

Thus, as shown in FIG. 13, in this embodiment, the digital audio tape recorder 1 disposes the magnetic heads 4A to 6B with the largest head level difference (16.5 TP) required in the operation modes of this digital audio tape recorder 1, and delays the audio data with the random access memory circuit 18 by the amount required for the head level difference of 8.5 TP or 12.5 TP.

This enables the digital audio tape recorder 1 to perform the write-after-read processing by switching the number of channels with a simple arrangement.

Figure 14:
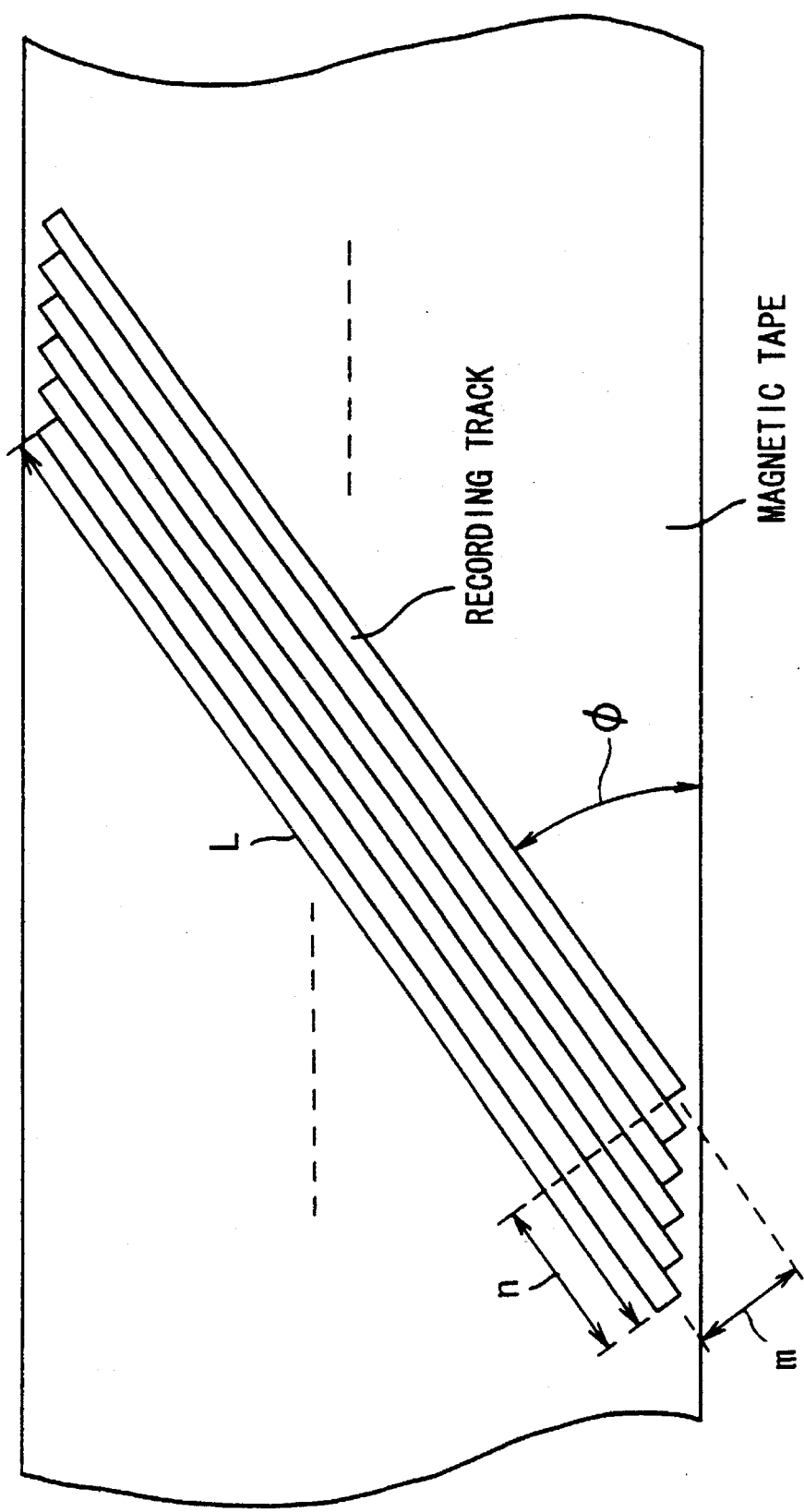
FIG. 14 is a schematic diagram for explaining angular division.
Figure 15:
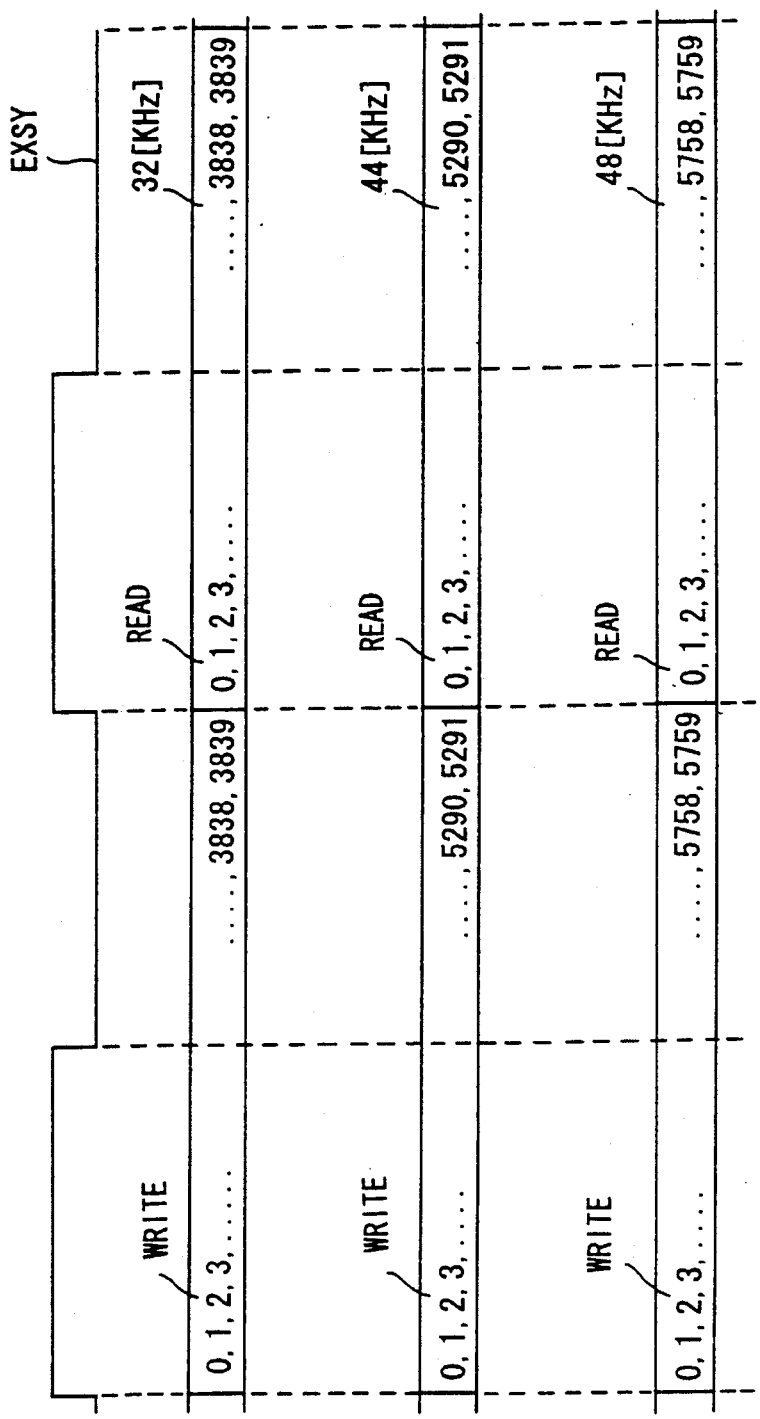
FIGS. 15A to 15D are schematic diagrams for explaining the operation of the random access memory circuit in normal operation mode.

To this end, as shown in FIG. 14, in the digital audio tape recorder 1, when the head level difference is set to 16.5 TP, the relationship between the track length L, the track angle φ, the distance n between scanning start ends on corresponding tracks, and the angle x from the reproducing magnetic heads 6A and 6B to the corresponding recording magnetic heads 4A and 4B (which is the angular division) can be expressed as:

$$x=90° \times \left( 1 - \frac{m}{L \times \tan\phi} \right) \quad (7)$$

By solving these equations, the reproducing magnetic heads 6A and 6B, and the recording magnetic heads 4A and 4B are disposed so that the angle from the reproducing magnetic heads 6A and 6B to the corresponding recording magnetic heads 4A and 4B is about 82° in spacing.

Furthermore, as shown in FIGS. 15A to 15D, in the normal operating mode, the timing generator 20 generates address data for the random access memory circuit 18 (FIGS. 15B to 15D) so that its value sequentially increments in a two frame cycle (FIG. 15A), whereby the recording system and the reproducing system sequentially store and output the reproduced audio data DADT and ADDT (D2A and D2B).

In this case, the timing generator 20 generates address data so that the stored audio data DADT and ADDT are delayed by the two frame cycle in the recording system and the reproducing system, respectively, whereby the output data of the reproduced signal processing circuit 24 is delayed by a cycle of four frames as a whole, and outputs to the recording signal generator circuit 24.

Thus, even if the operation mode is switched from the 44.1 [kHz] 4-channel mode, the 48 [kHz] 4-channel mode, or the 32 [kHz] 8-channel mode to the normal operation mode, the digital audio tape recorder 1 can perform the write-after-read processing of 2-channel audio signals only by changing over the address data generated by the timing generator 20.

On the other hand, in the 32 [kHz] 4-channel mode, the random access memory circuit 18 performs interleaving, and delays the audio data ADDT and DADT by one frame cycle, whereby the recording and/or reproducing system delays the audio data by two-frame cycle in total.

Figure 16:
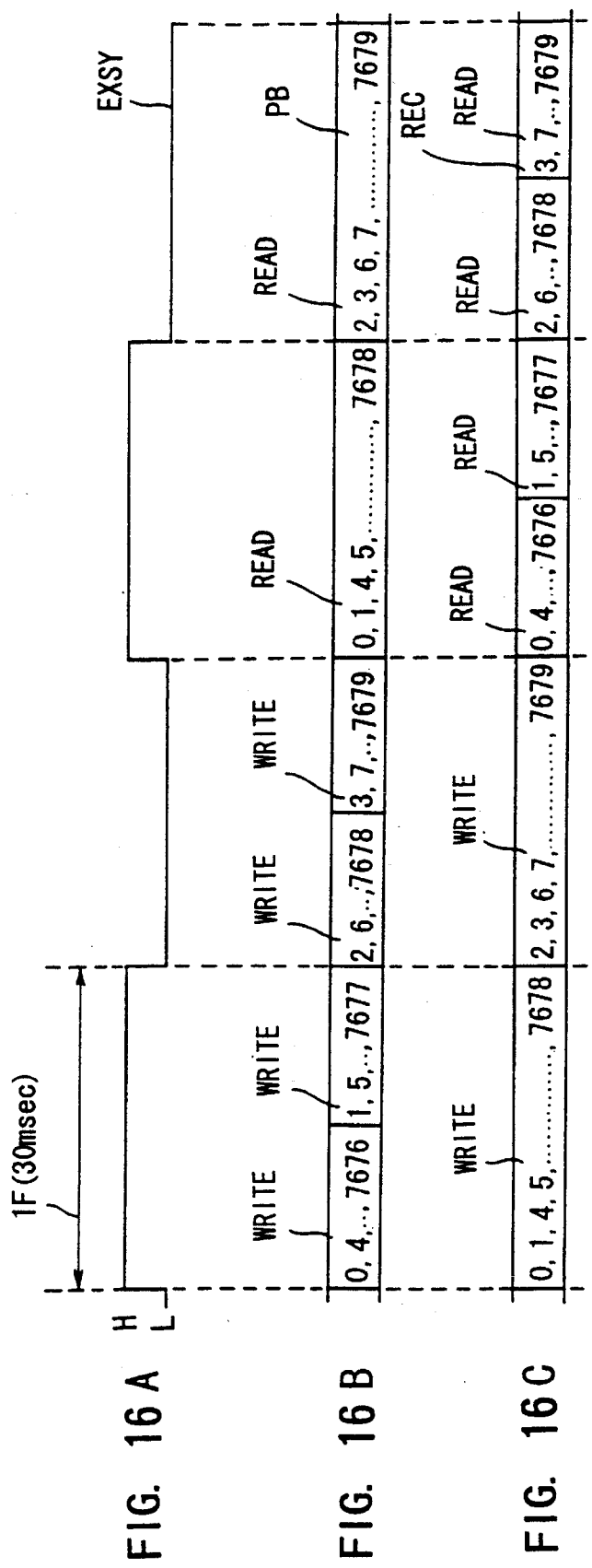
FIGS. 16A to 16C are schematic diagrams for explaining operation of a timing generator in the 32 [kHz] 4-channel mode.

Therefore, as shown in FIGS. 16A to 16C, the timing generator 20 generates address data as numbered in double in correspondence to FIGS. 3A to 3C so that interleaving can be performed in one frame cycle (FIGS. 16A–16C), and the address is repeated in a two-frame cycle.

That is, as shown in FIG. 17, when the audio data ADDT and DADT are stored, the timing generator 20 generates address data by setting the lower second bit of the first half frame and the second half frame to values "0" and "1", respectively, and sequentially incrementing the count of remaining bits by a value of "1".

On the other hand, in reproduction, as shown in FIG. 18, the timing generator 20 holds lower two bits at a value of "0, 0" and sequentially increments the count of remaining upper bits from a value of "0" in a step of "1". When the remaining upper bits reaches a value "1919", then it increments the count of lower two bits, and again sequentially increments the count of remaining upper bits from the value of "0" in a step of "1".

The timing generator 20 repeats this count incrementing operation for lower two bits with a value of "1, 1", whereby the random access memory circuit 18 performs interleaving, and outputs the audio data ADDT and DADT with a delay of one frame cycle.

Thus, when the operation mode is switched from 44.1 [kHz] 4-channel mode, 48 [kHz] 4-channel mode, or 32 [kHz] 8-channel mode to 32 [kHz] 4-channel mode, or even from 32 [kHz] 4-channel mode to the normal mode, the digital audio tape recorder 1 can perform the write-after-read processing for the 4- and 2-channel audio signals only by switching the address data generated from the timing generator 20.

(4) Effects of the embodiments

With the above constitution, when the audio data reproduced by the reproducing magnetic head is re-recorded by the recording magnetic head, the recording magnetic head is positioned behind the reproducing magnetic head for 16.5 track pitch so that the reproduced audio data can be re-recorded on the original recording track. Therefore, the write-after-read processing can be realized.

With the above-mentioned arrangement, a digital audio tape recorder which records or reproduces multichannel audio data by time base compression and expansion delays the audio data for a predetermined period of time by switching the operation of a memory circuit performing time base compression and expansion, whereby, when the operation mode is switched from the 44.1 and 48 [kHz] 4-channel mode or the 32 [kHz] 8-channel mode to the 32 [kHz] 4-channel mode or the normal mode, or even from the 32 [kHz] 4-channel mode to the normal mode, the write-after-read processing can be easily attained only by switching the operation of the timing generator.

(5) Other embodiments

Although the above embodiment is explained for a case where the audio data is delayed by a one-frame cycle or a two-frame cycle in the recording and reproducing systems, this invention is not only limited to such case, but the delay may be performed in either the recording or the reproducing system.

Furthermore, although the above embodiment is explained for a case where the random access memory is shared between the recording system and the reproducing system, this invention is not only limited to such case, but it may be possible to provide separate memories for the recording system and the reproducing system.

Furthermore, although the above embodiment is described for a case where the cycle processing interleave in the random access memory circuit 18 is switched. However, this invention is not only limited to this, but the process may be performed with the constant cycle, and moreover in the digital audio tape recorder for only 2-channel, data of the reproducing signal processing circuit may be directly inputted into the recording signal forming circuit.

Further, although the embodiment is described for a case where the audio data is processed by interleave processing with 2 frame cycle regarding a sampling frequency 44.1 [kHz] 4-channel mode, a sampling frequency 48 [kHz] 4-channel mode, and a sampling frequency 32 [kHz] 8-channel mode. However, this invention is not only limited to this, but the audio data with respect to a sampling frequency 32 [kHz] 4-channel mode, etc. may be interleave processed. Further, this invention is not only limited to 2 frame cycle, but if the audio data is processed by interleave processing in every cycle of 4 frame, this invention can be applied to 44.1 [kHz] 8-channel mode, etc. widely.

Further, although the embodiment is described for a case where the present invention is applied to a digital audio tape recorder for recording and reproducing digital audio signal. However, this invention is not only limited to this, but applied to a digital audio tape recorder for only recording, etc. widely.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A recording and/or reproducing apparatus for recording audio data by helically sequentially forming a pair of recording tracks with plus and minus azimuth angles on a magnetic tape, said magnetic recording and/or reproducing apparatus comprising:

a rotary drum having a magnetic tape wound therearound;

a pair of reproducing magnetic heads positioned on said rotary drum for reproducing a signal from a pair of recording tracks on said magnetic tape;

input means for inputting a $2^n$ channel signal, n being a positive integer and $2^n$ being a number of channels;

storing means for performing sampling processing for said inputted $2^n$ channel signal at a sampling frequency of $f_s$ and interleave processing for a result of the sampling processing for N frame cycles, and for storing data including data from said interleave processing and sampling processing;

recording signal forming means for performing block-interleave processing on a signal from said storing means, performing error correction on said block-interleave-processed signal, and converting said error-corrected signal into a recording signal at a frequency $f_r$;

control means for controlling said input means, said storing means including the sampling frequency $f_s$ of the sampling processing, and said recording signal forming means including the frequency $f_r$ of the recording signal; and a pair of recording magnetic heads positioned on said rotary drum behind said pair of reproducing magnetic heads, respectively, for at least 8.5+4N track pitch, for recording said recording signal from said recording signal forming means on said magnetic tape, wherein a frame cycle correlates to an amount of time for said pair of recording magnetic heads to form a pair of recording tracks and N represents the number of frame cycles in an interleave cycle, and wherein the sampling frequency and the number of channels in said recording and/or reproducing apparatus are either 32 kHz 2-channel, 44.1 kHz 2-channel, 48 khz 2-channel, 32 kHz 8-channel, 44.1 kHz 4-channel or 48 kHz 4-channel.

2. A recording and/or reproducing apparatus according to claim 1, wherein:

said pair of recording magnetic heads are positioned behind said pair of reproducing magnetic heads, respectively, for at least 16.5 track pitch when N=2; and the sampling frequency and the number of channels in said recording/reproducing apparatus are either 44.1 kHz 4-channel, 48 kHz 4-channel or 32 kHz 8-channel.

3. A recording and/or reproducing apparatus according to claim 1, wherein when a track length on said magnetic tape is "L", a track angle is "φ", a distance between scan starting terms of corresponding recording tracks is "n", a track pitch is m, tanφ=m/n, and an angle from one of said pair of reproducing magnetic heads to corresponding one of said pair of recording magnetic heads is "x", "x" is represented by the formula: (90°=90 degrees, *=multiplex symbol)

$$x = 90° * \left( 1 - \frac{m}{L \times \tan\phi} \right)$$

4. A recording and/or reproducing apparatus according to claim 1, further comprising:

channel switching means for changing the sampling frequency and the number of channels from 44.1 kHz 4-channel mode, 48 kHz 4-channel mode, or 32 kHz 8-channel mode into usual 2-channel mode; and a timing generator for controlling write and/or read of data to and/or from said storing means in accordance with operation of said channel switching means.

5. A recording and/or reproducing apparatus according to claim 1, further comprising:

channel switching means for changing the sampling frequency and the number of channels from 44.1 kHz 4-channel mode, 48 kHz 4-channel mode or 32 kHz 8-channel mode into 32 kHz 4-channel mode; and a timing generator for controlling write and/or read of data to and/or from said storing means in accordance with operation of said channel switching means.

6. A recording and/or reproducing apparatus, comprising:

a rotary drum having a magnetic tape wound therearound;

a pair of reproducing magnetic heads positioned on said rotary drum for reproducing a signal from a pair of recording tracks on said magnetic tape;

reproducing signal processing means for performing error correction for said reproduced signal, performing interleave processing on said error-corrected signal, and outputting an interleave-processed error-corrected reproduced signal;

storing means for performing de-interleave processing for said interleave-processed error-corrected reproduced signal output from said reproducing signal processing means into a $2^n$ channel reproduced signal with N frame cycles and storing data including data from said de-interleaved $2^n$ channel signal;

input means for inputting a second $2^n$ channel signal;

second storing means for performing sampling processing for said inputted second $2^n$ channel signal with sampling frequency $f_s$, performing interleave processing for said sample-processed second $2^n$ channel signal with N frame cycles, and supplying an interleave-processed sample-processed signal to said storing means;

recording signal forming means for performing block interleave processing for a signal outputted by said storing means, performing error correction for said block-interleave-processed signal, and converting said error-corrected signal into a recording signal;

control means for controlling the operation of said storing means, said input means, said second storing means and said recording signal forming means; and a pair of recording magnetic heads that are positioned on said rotary drum behind said pair of reproducing magnetic heads, respectively, for recording said recording signal from said recording signal forming means on said magnetic tape, wherein a frame cycle correlates to an amount of time for said pair of recording magnetic heads to form a pair of recording tracks, $2^n$ represents the number of channels and N represents the number of frame cycles in an interleave cycle.

7. A recording and/or reproducing apparatus according to claim 6, wherein:

$N=1, n=2, f_s=44.1$ kHz.

8. A recording and/or reproducing apparatus according to claim 6, wherein:

$N=1, n=2, f_s=48$ kHz.

9. A recording and/or reproducing apparatus according to claim 6, wherein:

$N=1, n=3, f_s=32$ kHz.

10. A recording and/or reproducing apparatus according to claim 6, wherein:

$N=2, n=2, f_s=44.1$ kHz.

11. A recording and/or reproducing apparatus according to claim 6, wherein:

$N=2, n=2, f_s=48$ kHz.

12. A recording and/or reproducing apparatus according to claim 6, wherein:

$N=2, n=3, f_s=32$ kHz.

* * * * *